United States Patent [19]
Covington

[11] 3,903,729
[45] Sept. 9, 1975

[54] METHOD AND APPARATUS FOR DETECTING A BREAK OR OTHER OCCURRENCE IN A PIPELINE CONTAINING GAS UNDER PRESSURE

[75] Inventor: Morris T. Covington, Houston, Tex.

[73] Assignee: Taft Broadcasting Corporation, Houston, Tex.

[22] Filed: Apr. 9, 1973

[21] Appl. No.: 349,422

Related U.S. Application Data

[63] Continuation of Ser. No. 196,327, Nov. 8, 1971, which is a continuation of Ser. No. 102,661, Dec. 30, 1970.

[52] U.S. Cl. .................................................. 73/40.5 R
[51] Int. Cl. .................................................. G01m 3/00
[58] Field of Search ............ 73/40.5 A, 40.5 R, 69, 73/67.9, 67.7, 71.4, 194 A; 340/18 NC; 181/.5, 125

[56] References Cited
UNITED STATES PATENTS

| | | | |
|---|---|---|---|
| 3,413,653 | 11/1968 | Wood | 73/40.5 A |
| 3,517,546 | 6/1970 | Fraser | 73/40.5 R |
| 3,561,256 | 2/1971 | Bustin et al. | 73/40.5 R |

Primary Examiner—Donald O. Woodiel

[57] ABSTRACT

A method and apparatus for rapidly detecting a break or other occurrence in a pipeline containing gas under pressure by detecting the adiabatic pressure wave generated in the gas by the break and propagated through the gas at the speed of sound. A method and apparatus for determining the distance between the break in the gas pipeline and the detection location by determining the change of pressure with respect to time of the leading edge of the adiabatic pressure wave. A method and apparatus for detecting a break or other occurrence in a pipeline containing a gas under pressure which pipeline is connected by a compression station or pumping station or the like, by detecting the compressional waves traveling in a preselected direction through the gas without substantial interference from compressional waves traveling in the opposite direction. Spaced pressure/electrical transducers are utilized to detect the compressional waves. Electronic circuitry is utilized to delay a selected one of the transduced electrical signals for a selected time interval to substantially eliminate the portion of the signal responsive to compressional waves traveling in the direction opposite the preselected direction.

23 Claims, 18 Drawing Figures

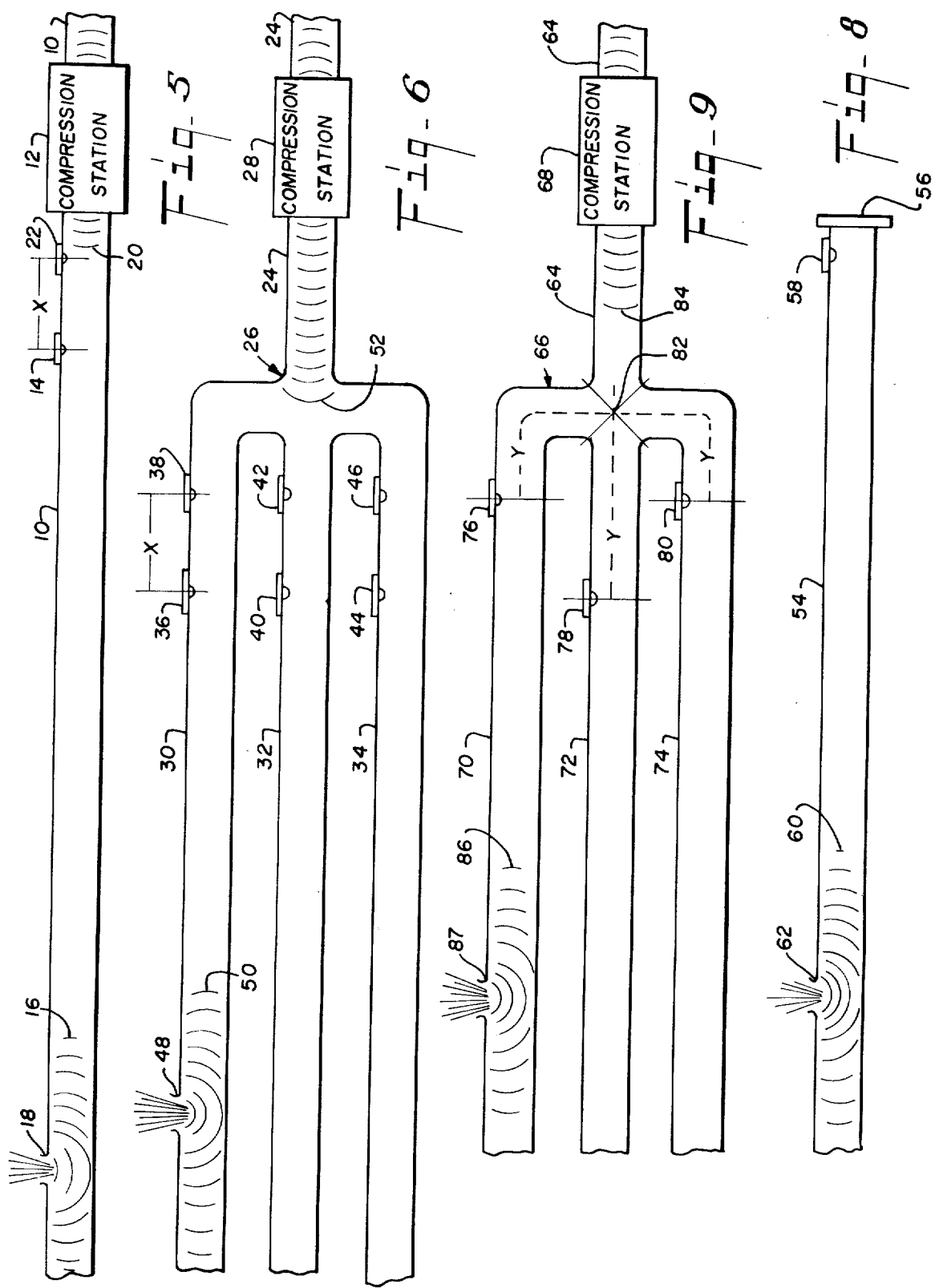

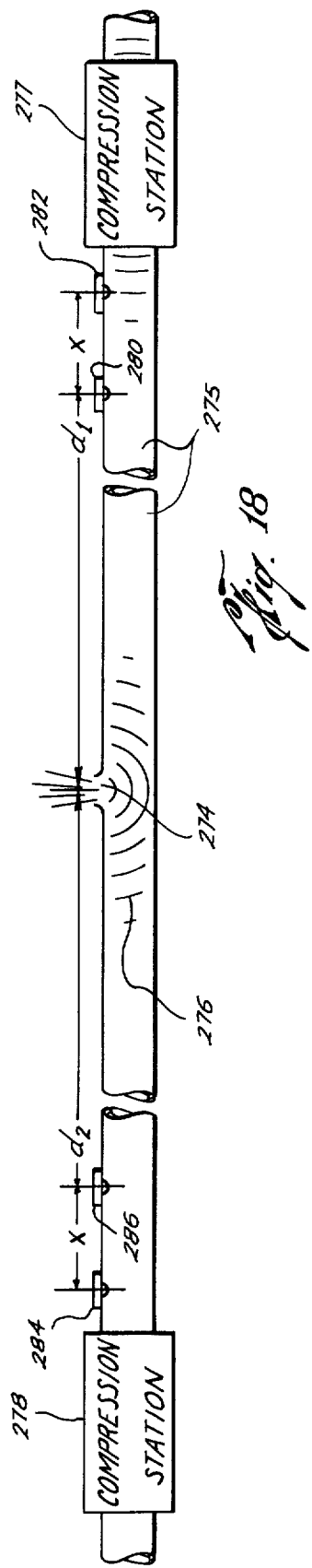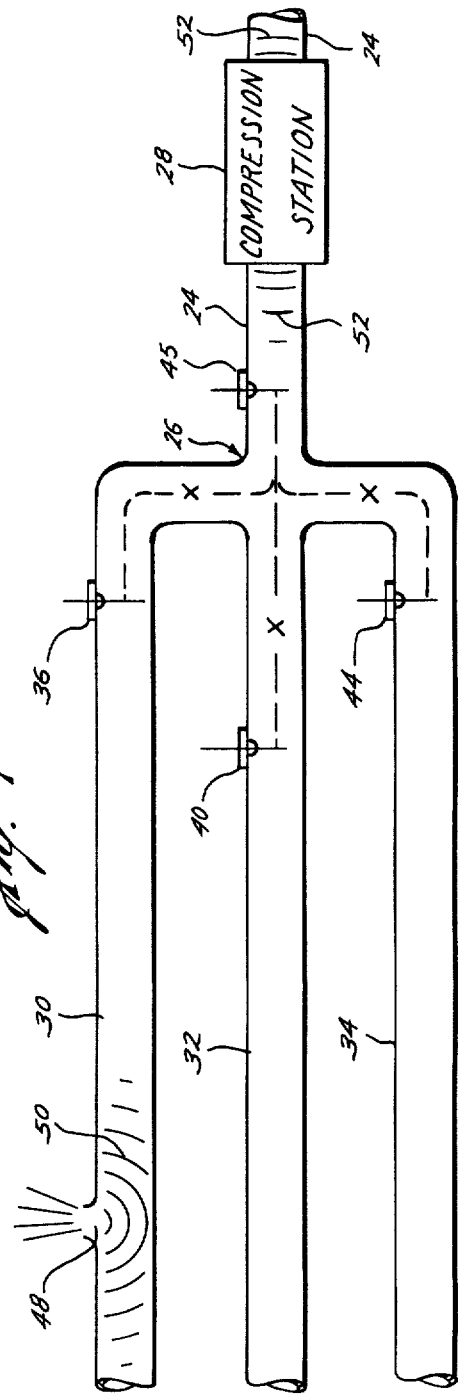

METHOD AND APPARATUS FOR DETECTING A BREAK OR OTHER OCCURRENCE IN A PIPELINE CONTAINING GAS UNDER PRESSURE

This application is a continuing application of my prior, co-pending application Ser. No. 196,327, filed Nov. 8, 1971, entitled "Directional Method and Apparatus for Detecting Compressional Waves in a Contained Fluid," which was a continuing application of my prior application Ser. No. 102,661, filed Dec. 30, 1970, entitled "Method and Apparatus for Detecting Conditions in a Fluid Conductor."

BACKGROUND OF THE INVENTION

This invention relates to the rapid detection of a break or other occurrence in an elongated vessel containing a fluid under pressure, and the determination of the distance from the detection location to the break. This invention has particular application to pipelines containing gas under pressure.

There exists today in those industries involved in transporting fluids cross-country in pipelines a need for a method and apparatus which will rapidly warn an operator of a break or rupture or other undesirable condition affecting the fluid in the pipeline. This need is especially acute when a plurality of pipelines are being utilized to transport the fluid. For instance, it is common practice in the transportation of fluids cross-country via pipelines to utilize a series of compression stations (located perhaps every 100 miles) to maintain fluid pressure. Although the fluid usually enters and leaves each compression station in a single pipeline, the fluid is generally divided into a plurality of interconnected pipelines, usually in parallel relationship, for transportation to the next compression station. When there is a condition or disturbance affecting the fluid in one of such pipelines, such as an explosion, the operators at the nearest compression stations are informed of the condition or disturbance only when the absolute pressure of the fluid in the single line to the compression station begins changing substantially. Although the absolute pressure of a liquid fluid may begin changing substantially rather quickly throughout the entire fluid, the absolute pressure of a compressed gaseous fluid at a point distant from the condition or disturbance does not change substantially until large amounts of such gas have escaped. This is because a gaseous fluid, unlike a liquid, is easily compressible and is therefore generally stored and transported in a state of rather high compression. And, regardless whether the fluid is a liquid or a gas, the operator is not informed as to which one of the plurality of interconnected pipelines is experiencing the disturbance. Therefore, he must interrupt the flow of the fluid through all of the plurality of pipelines to insure safety.

There exists a need for a method and apparatus which will not only detect a break in a pipeline containing a fluid, but will also determine the distance between the break and the detection location.

There also exists today a need for a simple, economic method and apparatus for rapidly transmitting data transduced into pressure pulses through a gas contained in a pipeline or other conductor.

And in both the case where a break, rupture or other condition is to be detected and indicated and the case where data transduced into pressure pulses is to be detected and indicated, there exists a need for an improved method and apparatus for detecting compressional waves indicative of such break, rupture, condition or data originating along one direction of the pipeline or conductor without error being introduced by compressional waves originating along the other direction of the pipeline or conductor. This need has been previously recognized, but as yet has not been effectively solved.

OBJECTS OF THE INVENTION

It is a primary object, therefore, of this invention to provide a method and apparatus to detect rapidly a condition, such as a break or rupture, occurring in a pipeline in which fluid is being transported or stored.

A further object is to provide a detecting apparatus which may be located at a desired point on the pipeline and which will effectively indicate a condition, such as a break or rupture, occurring distantly in such pipeline.

Another object is to provide a detecting and indicating method and apparatus applicable to a plurality of interconnected fluid conductors, said detecting and indicating method and apparatus being so arranged that a condition, such as a break or rupture, generating compressional waves in one of said fluid conductors will actuate said apparatus in a manner to indicate not only the fact that such condition has occurred but also to identify the particular conductor in which said condition occurred.

Still another object of this invention is to provide a method and apparatus for detecting a condition, such as a break or rupture, in a fluid conductor which method and apparatus utilizes the compressional waves generated by such condition to actuate indicating means, the utilization of said compressional waves providing for rapid detection by reason of the rapidity of travel of the waves through the fluid medium in said conductor.

It is an object of this invention to provide an improved method and apparatus for use with an elongated vessel containing gas under pressure which provides a rapid determination of a break in such vessel by detecting the adiabatic pressure wave generated through the contained gas as a result of such break and which provides from the characteristics of the leading edge of such adiabatic pressure wave an accurate determination of the distance between the break in such vessel and the detection location.

A further object of this invention is to provide an improved method and apparatus for telemetering data through gas contained in a conductor.

More particularly, it is an object of this invention to provide an improved method and apparatus for transducing data into pressure pulses in a contained gas, for rapidly detecting at a distant location in the gas the adiabatic pressure waves propagated through the gas as a result of such pulses, and for transducing such detected adiabatic pressure waves into electrical signals indicative of such data.

A still further object of this invention is to provide an improved method and apparatus for detecting the existence of a break or other occurrence in a pipeline containing fluid under pressure in which compressional waves generated by the break or other occurrence and traveling in a preselected direction through the fluid are detected without interference from or error being introduced by compressional waves traveling in the opposite direction.

More particularly, it is an object of this invention to provide an improved directional compressional wave detection method and apparatus which does not require the use of an electrical analog network representing the flow path and/or a mechanical differential pressure transducer with its attendant unequal fluid pressure paths thereto, and thereby obviate the disadvantages arising out of these devices.

It is an object of this invention to provide a simple, inexpensive, dependable and accurate directional compressional wave detection method and apparatus.

SUMMARY OF THE INVENTION

Contained fluids exert forces on material solids with which they are in contact. Such forces are described as the pressure of the fluid. Whether the contained fluid be static or dynamic, there exist relatively constant parameters, such as the homogeneity, density, viscosity, compressibility, height and velocity of the fluid, which affect such fluid pressure.

In addition to these relatively constant parameters, a vibrating object in contact with the fluid will communicate transient pressures to the fluid. When such vibrating object moves backward and forward in the fluid, it compresses the fluid surrounding it. This compression is rapidly relieved by the yielding of the adjacent layers of fluid, and the state of compression travels outward in all directions from the source at the speed of sound for that fluid. When the fluid is contained in a pipeline, such compressional waves are transmitted through the fluid along the pipeline in either direction from the vibrating object.

This invention recognizes the principle that a vibrating condition or disturbance affecting fluids contained in a conductor—such as a break or rupture of the conductor, the sudden opening or closing of a valve, or the compression and pumping of the fluid—generates compressional waves which are propagated through the fluid medium at the speed of sound for such fluid. A pressure-sensitive means is employed in communication with the contained fluid at a desired point therein and detects the transient changes of fluid pressure which comprise the compressional waves generated by such vibrating condition or disturbance. The transient changes in pressure detected by such pressure-sensitive means are transformed by transducer means to corresponding changes in electrical voltage. These changes in electrical voltage responsive to the compressional waves function to emit a warning that a vibrating condition is affecting the fluid in the pipeline. This invention detects such disturbance as rapidly as the compressional waves can travel at the speed of sound through the fluid to the point of detection.

This invention provides a method and apparatus for detecting and indicating the existence of a disturbance generating compressional waves in one or more interconnected conductors.

This invention provides an improved method and apparatus for detecting compressional waves traveling in a preselected direction through a fluid contained in an elongated conductor without interference from or error being introduced by compressional waves traveling in the opposite direction by positioning two pressure transducers a known distance apart longitudinally in the contained fluid and utilizing electronic circuitry to time-coordinate the outputs of said transducers whereby the undesirable compressional waves are filtered.

It was originally believed that the transient changes in the pressure of a contained fluid under pressure generated by a break or rupture in the container, the sudden opening or closing of a valve, or the compression and pumping of the fluid, and propagated through the fluid at the speed of sound, were primarily caused by the vibrations of such break or the like. The movement of such transient change in the pressure of the fluid through the fluid was believed to be a compressional wave and were referred to as a compressional wave.

It is now believed, and this invention recognizes, that a fluid contained in a vessel, such as a pipeline, experiences a rapid and significant pressure change within a certain location when there is a break or rupture of the vessel, the rapid closing or opening of a valve, or the compression and pumping of the fluid. when there is the rapid closing of a valve in a pipeline containing a flowing fluid, there is a rapid and significant increase in the pressure of the contained fluid in the vicinity of the valve. When there is a break, rupture or other condition resulting in a rapid opening of the pipeline, there is a rapid and significant decrease in the pressure of the fluid in the vicinity of the break. The speed and violence of this break or other occurrence can vary greatly. But so long as a significant pressure change (whether increase or decrease) is experienced by the fluid within a certain location in the pipeline in a relatively short period of time, the condition qualifies as a break or other occurrence. A condition in a pipeline containing a fluid under pressure which produces a rapid and significant decrease, rather than increase, in the pressure of the fluid at a certain location shall be referred to as a "break." A pipeline leak, by contrast, does not produce a rapid and significant pressure decrease at the point of the leak.

This invention recognizes that when a pipeline subjected to a break contains a liquid under pressure, the rapid and significant decrease in the pressure of the liquid at the point of the break is propagated throughout the pipeline by the liquid actually flowing toward the point of the break. Due to the noncompressibility of liquids, physical movement of the liquid is the way in which a pressure decrease is propagated throughout the contained liquid. This movement of the liquid toward the break evidences itself as a varying decrease in the absolute pressure of the liquid along the length of the pipeline. If one could view the decreasing absolute pressure of the liquid in a pipeline as the pressure decrease moves through the liquid in either direction from the break, it would resemble a "wave." Since for a given size break in a pipeline the rate or velocity at which the pressure drop propagates through the liquid is directly proportional to the viscosity or friction of the liquid in the pipeline, the propagating pressure drop is commonly referred to as a "viscous pressure wave" or "friction pressure wave." The viscosity of a liquid also determines the speed at which sound will move through such liquid, and thus the viscous pressure wave moves through the liquid at the speed of sound for such liquid.

As stated above and in the two prior applications on this invention, it was originally believed that the pressure drop traveling through the liquid at the speed of sound was primarily caused by vibrations attendant to the break (such as the jagged hole at the break) and the pressure drop moving at the speed of sound was referred to as a "compressional wave." It is now believed that the pressure drop moving through the liquid at the speed of sound is a viscous pressure wave or frictional pressure wave and is primarily caused by the rapid and significant decrease in the pressure of the liquid at the break. When the term "compressional wave" is used herein with respect to a liquid, it includes a viscous pressure wave or frictional pressure wave.

As previously mentioned, the velocity at which the pressure drop is propagated through the liquid (due to the liquid moving toward the break) is dependent on the viscosity of the liquid and the size of the break. For any particular size of break, the greater the viscosity of the liquid, the slower the velocity of the viscous wave. Moreover, the magnitude of the pressure drop in the liquid at the point of the break is directly proportional to the size of the break. However, the magnitude of the pressure drop propagated through the liquid decreases proportionally to the inverse of the square of the distance from the break.

Prior art detection systems which detect breaks in pipelines containing a liquid by monitoring the pressure of the liquid have had great difficulty with the transient pressure changes or "noise" constantly occurring in the liquid due to the compressional waves or viscous pressure waves generated by pumping stations and the like. The prior art systems therefore only detect large pressure drops occurring in a selected time interval. A break-produced viscous pressure wave which has traveled a long distance through the liquid to the detection device may be so attenuated that it will not be distinguishable from the "noise." Therefore, as has previously been stated, this invention provides a method and apparatus for detecting breaks in vessels containing liquids under pressure in which the compressional wave or viscous pressure wave generated in the liquid by the break and propagated through the liquid at the speed of sound toward the detection means is detected, and the compressional waves or viscous pressure waves generated by pumping stations and the like in the liquid and propagated through the liquid at the speed of sound toward the detection means from the other direction are not allowed to produce errors in such detection.

This invention further provides a method and apparatus for detecting breaks in vessels containing liquids under pressure in which the viscous pressure wave or compressional wave generated in the liquid by the break and propagated through the liquid at the speed of sound is detected by a detection means spaced from the break on either side thereof and the position of the break between the two detection means is determined.

This invention recognizes that when the pipeline subjected to a break contains a gas under pressure, the rapid and significant decrease in the pressure of the gas at the point of the break is propagated throughout the gas by two different modes: a viscous pressure wave or friction pressure wave caused by the gas flowing significantly toward the break (similarly to the viscous wave in a liquid), and an adiabatic pressure wave caused by the very rapid expansion of the gas.

These two modes of propagating the pressure change through the gas correspond to the two fundamental modes of flow of gas in a pipeline: at one extreme, the rate of flow of a gas is highly variable producing an adiabatic pressure/density relationship in which all of the work of the flowing gas is consumed in adiabatic pressure drops; at the opposite extreme, all of the work of a flowing gas is consumed by friction losses which produce pressure drops. Although the two modes of flow can occur simultaneously, in a gas pipeline the frictional forces normally dominate the inertial forces and the flow characteristics of gas through the pipeline comprise the second mode. The friction losses produced by the flowing gas create a pressure gradient extending through the gas along the length of the pipeline. In long pipelines, compression stations are used to replace the energy lost to friction.

This invention recognizes, however, that if the pipeline experiences a break, the sudden acceleration of gas toward the break causes the inertial forces to predominate and an adiabatic pressure wave propagates through the gas in both directions from the break at the speed of sound for the gas. Gas can expand adiabatically or contract adiabatically; in the case of a break in a pipeline containing gas under pressure, the adiabatic change in the volume of the gas is always an expansion. The leading edge of the adiabatic pressure wave (expanding) propagating from the break may be defined as rarefactional, and the adiabatic wave itself moving through an expanding gas may be referred to as a "rarefactional wave."

For any given point in the gas spaced from the break, at some instant of time after the pressure has dropped due to the adiabatic expansion of the gas (adiabatic pressure wave), the flow of the gas toward the break increases sufficiently to produce a decrease in the pressure of the fluid due to friction losses (viscous pressure wave). At sufficient distances, the friction losses will again predominate and the pressure drops of the gas will match the characteristics of an ordinary flowing gas.

Prior art methods and apparatus for detecting breaks in pipelines containing gas under pressure by monitoring the pressure of the gas react to a large decrease in the pressure of the gas caused by friction losses, that is, a significant flow of the gas toward the break producing a viscous pressure wave or frictional pressure wave. These prior art devices are calibrated to ignore the changes in the pressure of the gas produced by compression stations and the like. Since this "noise" can easily average plus or minus twenty psi in a flowing gas contained at 650 psi, the prior art devices typically are calibrated to react to a viscous pressure wave producing a pressure drop in excess of one hundred psi.

Any rate of flow of the contained gas toward the break sufficient to produce attendant friction losses is, similarly to the viscous pressure wave in liquids, dependent on the viscosity of the gas, which in turn includes many variables such as the diameter of the pipe, the roughness of the pipe, the operating pressure of the gas in the pipe, and the composition of the gas. The more viscous and gas, the less the rate of flow of the gas toward the break and the less the friction losses. The size of the break also affects such rate of flow and the attendant friction losses. The viscous pressure wave of course exists because of the flow of the gas toward the break (the friction losses attendant to such flow produce the pressure decreases comprising the viscous pressure wave). As such, the rate of propagation of the viscous pressure wave through the gas equals the rate of flow of the gas toward the break. Although the viscous pressure wave may propagate through a gas in the vicinity of the break at a velocity approaching the speed of sound, its rate of propagation decreases as the distance from the break increases. Moreover, the magnitude of the pressure drop in a gas defining the viscous pressure wave is proportional to the square of the rate of the flow of the gas toward the break. The viscous pressure wave in a gas therefore decreases in measurable strength proportional to the inverse of the square of the distance from the break.

It is now understandable why it generally takes a viscous pressure wave a relatively long time to produce a sizable pressure drop distantly in a high-pressure gas contained in a pipeline. Indeed, it may take 30 minutes for a viscous pressure wave generated by a five inch break in a 36 inch pipeline containing gas at 850 psi to produce a 6 pound pressure drop 25 miles from the break. And when the viscous wave reaches the detection device, the magnitude of its pressure drop over a selected period of time ($dp/dt$) may be so small that the detection device cannot distinguish the viscous pressure wave from "noise" coming from the opposite direction. In such a case, the prior art devices then do not react to the pressure drops until the absolute pressure has dropped a selected amount, such as the pressure in a 650 psi pipeline decreasing to 550 psi.

This invention recognizes that when the pressure of the gas in a pipeline is monitored by a detection device in accordance with this invention whereby the compressional wave which is produced by a break in the pipeline and which moves toward the detection device from one direction is detected, and whereby the compressional waves which are produced by a compression station and the like and which move toward the detection device from the other direction are not allowed to obfuscate or produce errors in the detection, the adiabatic pressure wave generated by the break may be detected.

The adiabatic pressure wave, unlike the viscous pressure wave, travels through the compressed gas at the speed of sound for that gas irrespective of the viscosity of the gas. The rate of the pressure change for a selected interval of time ($dp/dt$) is much greater for the adiabatic pressure wave than for the viscous pressure wave. The adiabatic pressure wave propagates without significantly affecting the time averaged velocity of the flow of the gas toward the break. And unlike the viscous pressure wave, which decreases in measurable strength proportional to the inverse of the square of the distance from the break, the adiabatic pressure wave decreases in measurable strength only proportional to the inverse of the distance from the break.

As stated above and in the two prior applications on this invention, it was originally believed that the pressure drop traveling through the gas at the speed of sound was primarily caused by vibrations attendant to that break (such as the jagged hole at the break) and the pressure drop moving at the speed of sound was referred to as a "compressional wave." It is now believed that the pressure drop moving through the gas at the speed of sound is an adiabatic pressure wave or rarefaction pressure wave and is primarily caused by the rapid and significant decrease in the pressure of the gas at the break caused by the large volume of gas exiting through the break. When the term "compressional wave" is used herein with respect to a gas, it includes both adiabatic pressure waves and viscous pressure waves traveling through the gas.

Therefore, as has previously been stated in slightly different language, this invention provides an improved method and apparatus for detecting a break in a pipeline containing gas under pressure in which a detection device detects the adiabatic pressure wave generated by the break in the gas and propagated through the gas at the speed of sound.

And, as has also previously been stated, this invention provides an improved method and apparatus for detecting a break in a pipeline containing gas under pressure in which a detection device detects the adiabatic pressure wave which is generated in the gas by the break and propagated through the gas toward the detection device, and in which adiabatic pressure waves and viscous pressure waves propagated through the gas toward the detection device from the other direction are not allowed to obfuscate or produce errors in the detection.

This invention further provides a method and apparatus for detecting breaks in vessels containing gas under pressure in which the adiabatic pressure wave generated in the gas by the break and propagated through the gas is detected by detection means spaced from the break on either side thereof and the position of the break between the two detection means is determined.

The decrease in magnitude of the pressure of a fluid, whether it be liquid or gas, over a selected, transient interval of time ($dp/dt$) accompanying the passage of the leading edge of a viscous pressure wave is dependent on numerous variables, two of which are unknown: the distance to the break and the size of the break. Due to this fact that the size of the break affects the slope or $dp/dt$ of the leading edge of the viscous pressure wave, it is impractical to use such slope or $dp/dt$ to determine the distance to the break. This invention recognizes, however, that the decrease in magnitude of the pressure of a gas over a selected, transient interval of time ($dp/dt$) accompanying the passage of the leading edge of an adiabatic pressure wave is dependent on numerous variables, but only one of them is unknown: the distance to the break.

Thus this invention provides an improved method and apparatus for detecting a break in a pipeline containing gas under pressure in which a detection device detects the adiabatic pressure wave generated in the gas by the break and propagated through the gas toward the detection device, and in which the distance between the break and the detection device may be determined from the $dp/dt$ or slope of a portion of the leading edge of the adiabatic pressure wave.

This invention provides a method and apparatus for telemetering data through a contained gas under pressure by transducing such data into binary format consisting of the presence or absence of pressure pulses in the contained gas, rapidly detecting such pressure pulses at a distant location in the gas, transducing such detected pressure pulses back into data, and indicating such data.

BRIEF DESCRIPTION OF THE DRAWINGS

The invention itself both as to organization and method of operation, as well as additional objects and advantages thereof, will become readily apparent from the following description when read in connection with the accompanying drawings in which like numerals represent like parts:

FIg. 5 is a schematic view of a pipeline having the mechanical portions of the preferred embodiment of this invention associated therewith.

FIG. 6 is a schematic view of the mechanical portions of the preferred embodiment of this invention applied to a plurality of interconnected conductors.

FIG. 7 is a schematic view similar to FIG. 6 showing the mechanical portions of a modification of the preferred embodiment of this invention applied to a plurality of interconnected conductors.

FIG. 8 is a schematic view similar to FIG. 5, wherein a single transducer means is utilized in a single conductor.

FIG. 9 is a schematic view similar to FIG. 6, and illustrating a single transducer means utilized in each of a plurality of interconnected conductors.

FIG. 18 is a schematic view showing the preferred embodiment of this invention applied to a single pipeline at two locations and being utilized to determine the location of a break in such pipeline.

DESCRIPTION OF THE PREFERRED EMBODIMENTS

Figure 1:
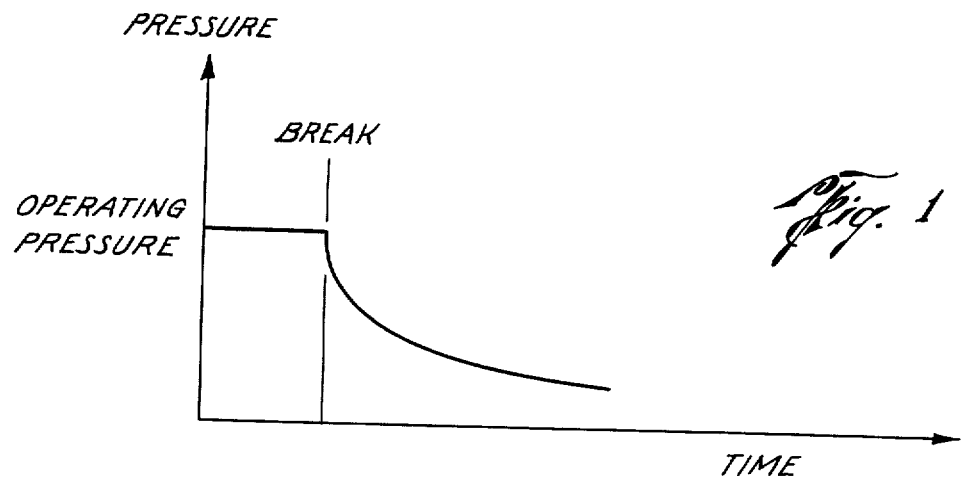
FIG. 1 illustrates graphically with respect to time, the changes in the pressure of a static fluid contained in a pipeline at the point of a break in the pipeline.
Figure 2:
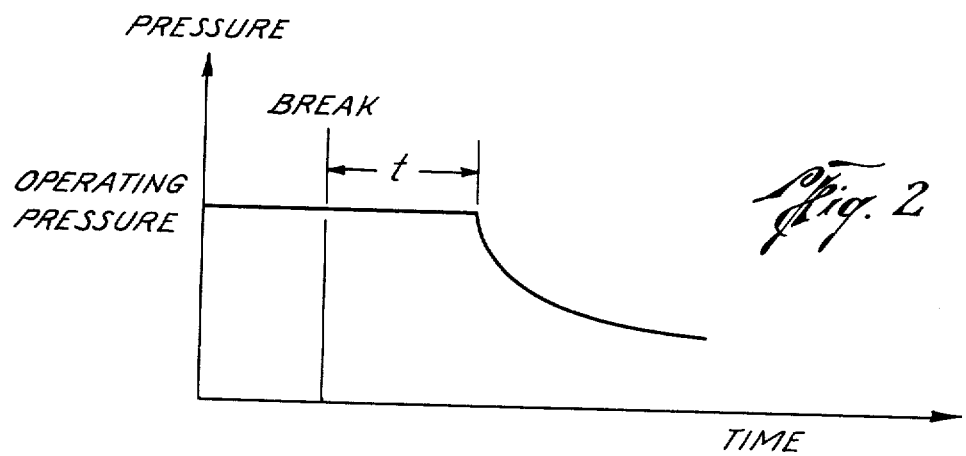
FIG. 2 illustrates graphically with respect to time, the changes in the pressure of a static liquid contained in a pipeline at some point distant from a break in the pipeline.
Figure 3:
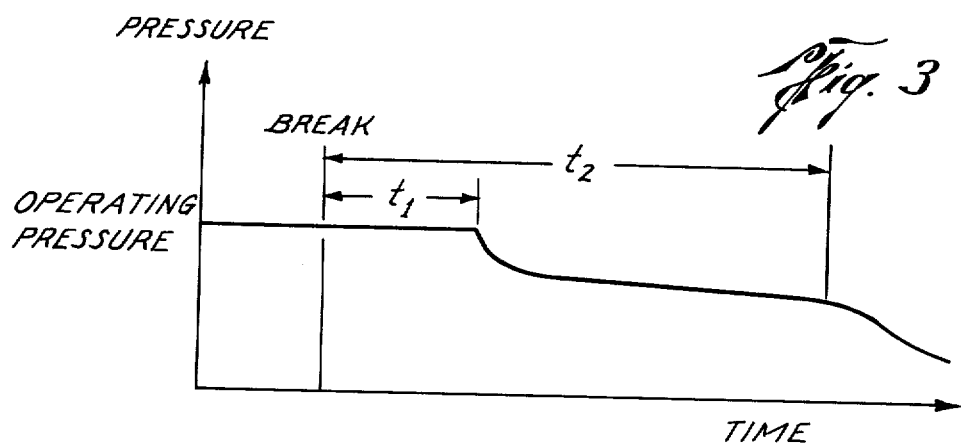
FIG. 3 illustrates graphically with respect to time, the changes in the pressure of a static gas contained in a pipeline at some point distant from a break in the pipeline.

FIGS. 1, 2 and 3 illustrate changes in the pressure of a fluid contained in a pipeline with respect to time. It is assumed for purposes of these three illustrations that the fluid is static, that is, there are no transient changes in the pressure ("noise") of the fluid caused by compression stations, pumping stations, and the like. FIG. 1 illustrates the pressure in the fluid, whether liquid or gas, at the point of a break in the pipeline. Immediately after the break occurs there is a rapid and significant decrease in the pressure of the fluid.

FIG. 2 illustrates the changes in the pressure of a liquid contained in a pipeline at some point distant from a break. At some point in time after the break occurs, the pressure of the liquid begins to decrease from the operating pressure. The time interval ($t$) before the pressure begins to decrease depends on the viscosity of the liquid, the distance between the break and the point at which the pressure of the liquid is being monitored, and the size of the break. As previously mentioned, due to liquids being noncompressible, the viscosity also controls the speed of sound in the liquid and thus the viscous pressure wave travels at the speed of sound through the liquid.

FIG. 3 illustrates the changes in the pressure of a gas contained in a pipeline at some point distant from a break. As has previously been discussed, a break in a pipeline containing gas under pressure produces a decrease in the pressure of the gas which propagates through the gas in two modes: an adiabatic pressure wave and a viscous pressure wave. Although the adiabatic pressure wave and the viscous pressure wave have been heretofore described separately, they may also be thought of as both being part of the same compressional or pressure wave that propagates the pressure decrease caused by the break to each end of the pipeline. The adiabatic or rarefactional pressure wave and the viscous or frictional pressure wave may be thought of as "sections" of the total pressure wave generated by the break. The adiabatic or rarefactional pressure wave section travels at the speed of sound in the gas and much faster than the viscous or frictional pressure wave section which propagates proportionally to the rate of flow of the fluid toward the break and which propagates less rapidly as the distance from the break increases. As illustrated in FIG. 3, at some point in time ($t_1$) after the break occurs the adiabatic pressure wave reaches the point in the gas at which the pressure of the gas is being monitored. The passing of the adiabatic or rarefactional pressure wave section is evidenced by a relatively rapid but relatively small decrease in the pressure of the gas as the gas expands adiabatically. The decrease in the pressure of the gas as it expands adiabatically is linear with respect to time. The time interval ($t_1$) before the pressure of the gas begins to decrease responsive to the passing of the adiabatic pressure wave depends on the speed of sound in the gas and the distance between the break and the point at which the pressure of the gas is being monitored. However, the decrease in the pressure of the gas with respect to time (the $dp/dt$ or slope of the pressure drop) during the adiabatic expansion of the gas is proportional to the distance from the break.

After the passing of the adiabatic pressure wave, the pressure of the gas remains at its diminished magnitude and slowly decreases further as the gas begins to flow significantly toward the break. It is difficult to determine in a gas when the viscous pressure wave first arrives at the point being monitored. But at some longer interval of time ($t_2$) after the break occurred the pressure of the gas begins to decrease significantly due to the friction losses developed as the gas flows toward the break. As in the case with liquids, the time interval before the pressure begins to decrease significantly responsive to the passing of the viscous pressure wave section depends on the viscosity of the gas, the distance between the break and the point being monitored, and the size of the break.

Figure 4:
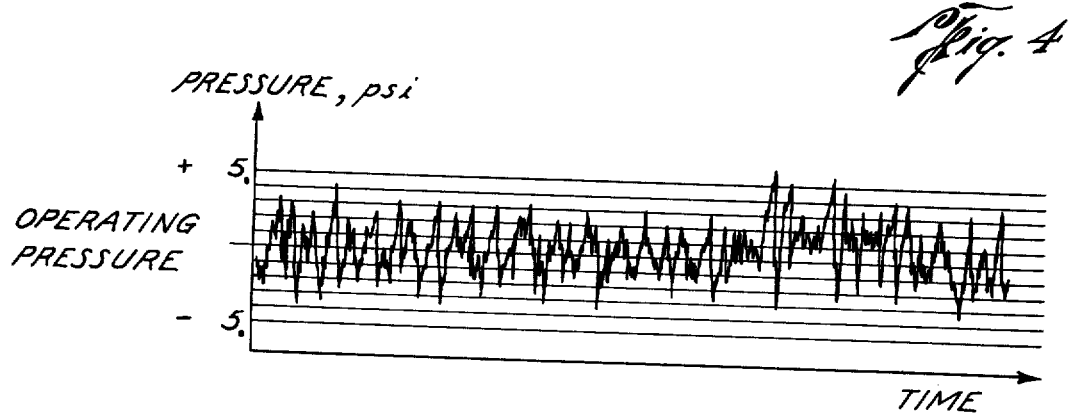
FIG. 4 illustrates graphically with respect to time, the transient changes in the pressure of a gas contained in a pipeline at a point in the vicinity of a compression station.

FIG. 4 illustrates with respect to time the changes in the pressure of a gas contained in a pipeline at a point near a compression station. The activity of the compression station is producing transient pressure changes generally in the range of plus or minus three pis per 0.5 seconds. It is quite common, though not shown in FIG. 4, for the transient pressure changes in a gas to range as far as plus or minus 25 psi per 0.5 seconds. It can be observed that an adiabatic pressure wave producing a pressure decrease of 0.5 psi or less per 0.3 seconds could be indistinguishable from this noise. Thus, the prior art methods and apparatus utilized to monitor the pressure of a gas experiencing noise as illustrated in FIG. 4 would be calibrated to detect changes in pressure of approximately 10 psi or greater. Since an attenuated adiabatic pressure wave section of a compressional wave generated by a break in a pipeline containing gas often has a magnitude less than one or two psi, the prior art methods and apparatus must monitor the large pressure changes attendant to the viscous pressure wave section of the compressional wave.

A. Preferred Embodiment: Pair of Transducers Means/Single Conductor

The physical arrangement of the mechanical portions of the preferred embodiment of this invention are shown schematically in FIG. 5 with respect to a conductor utilized to transport fluid. The conductor 10 is an ordinary apparatus, such as metallic pipeline, and shall hereinafter be referred to as a pipeline. The pipeline 10 communicates with the intake and output of a compression station 12 through which the fluid (not shown) is forced. The "fluid" may be either liquids or gases. The fluid normally fills the volume of the pipeline, but if the fluid being transported is a liquid it is possible that some unfilled space in the pipeline may exist.

A transducer means 14, which monitors the fluid pressure and functions to detect changes in such fluid pressure and produce corresponding changes in voltage, is secured by suitable means, such as welding or otherwise (not shown), to the pipeline 10 in such a position and manner that the pressure-sensitive element of such transducer means 14 is in communication with the fluid contained in the pipeline 10.

As fluid is initially pumped into the pipeline 10 from the compression station 12, the fluid pressure sensed by the transducer means 14 will increase dramatically. The fluid pressure stabilizes as the major parameters affecting the fluid, such as rate of flow and fluid height, become constant. Thereafter, transducer means 14 will detect the transient changes in pressure comprising compressional waves 16 (viscous pressure waves if the fluid is a liquid, or, if the fluid is a gas, adiabatic pressure waves and viscous pressure waves) generated by a vibrating condition or disturbance or break occurring along one direction of the pipeline, such as a rupture or break 18, and compressional waves 20 (viscous pressure waves if the fluid is a liquid, or, if the fluid is a gas, adiabatic pressure waves and viscous pressure waves) generated by a vibrating condition or disturbance along the other direction of the pipeline, such as the compression station 12. However, the single transducer means 14 cannot distinguish between a compressional wave coming from the compression station and a compressional wave coming from downstream. Therefore, in order to vitiate the effect of compressional waves emanating from the compression station, the preferred embodiment of this invention utilizes a second transducer means 22.

Such second transducing means 22 is secured by suitable means to the pipeline in such a position and manner that the pressure-sensitive element therein is in communication with the fluid contained in the pipeline. The second transducer means 22 is spaced longitudinally and a known distance X from the first transducer means 14. It is preferable that the two transducer means 14 and 22 are positioned relatively close together in order to diminish the time required for a compressional wave to travel at the speed of sound for the fluid medium from one transducer means to the other. Also, such positioning diminishes the possibility of a loss of pressure or change of frequency occurring in the compressional wave as it travels between the two transducer means.

As will be explained in detail, the two transducer means 14 and 22 function conjunctively to detect and actuate indicating means responsive to a vibrating condition or disturbance or break occurring downstream, but to substantially ignore an upstream vibrating condition or disturbance, and to prevent such upstream compressional waves from obfuscating the downstream waves or causing error in the detection of the downstream waves. In other words, the conjunctive use of two transducer means in the method and apparatus herein disclosed creates a directional detection device. Since substantially all compressional waves generated by a vibrating condition or disturbance from the direction of the compression station 12 are ignored or filtered, the pair of transducer means 14 and 22 should be physically located near the compression station in order to diminish as much as possible the amount of unprotected pipeline.

In order to protect all of the pipeline a pair of the conjunctively-functioning transducer means according to this invention should be positioned on both the upstream and downstream side of each compression station along the pipeline route.

B. Preferred Embodiment: Plurality of Pairs of Transducer Means/Plurality of Conductors A plurality of the above described conjunctively-functioning pair of transducer means according to this invention may be employed when fluids are contained in a plurality of interconnected pipelines. In such modification, the method and apparatus according to this invention indicated not only the fact that a vibrating condition or disturbance or break has occurred, but also the particular pipeline in which such condition occurred.

FIG. 6 shows schematically in horizontal cross-section the physical arrangement of the mechanical portions of the preferred embodiment of this invention employed on a plurality of interconnected pipelines. A single pipeline 24 branches at a header 26 located downstream from a compression station 28 into three interconnected pipelines 30, 32 and 34. Transducer means 36 & 38, 40 & 42, and 44 & 46 are secured in pairs by ordinary means to pipelines 30, 32 and 34, respectively. The position of each pair of transducers longitudinally along the pipe is unimportant except each pair preferably should be located relatively close to the header 26 to diminish the length of unprotected pipeline. The position of each pair of transducers with respect to each other pair of transducers is not important. But as previously explained the distance X between the two transducer means forming each pair must be known.

Assume that a downstream vibrating condition or disturbance, such as a rupture or break 48, occurs in pipeline 30. Such condition or break generates a compressional wave 50 (a viscous pressure wave if the fluid is a liquid, or, if the fluid is a gas, an adiabatic pressure wave and a viscous pressure wave) which is detected initially by transducer means 36 and 38. Since these two transducer means function conjunctively to detect and to activate an indicator means responsive to compressional waves generated downstream, the indicator means will notify the operator that a disturbance has occurred in pipeline 30. The compressional wave 50 will of course continue on through the fluid past transducer means 42 & 40 and 46 & 44. However, since each of these two pairs of transducer means function conjunctively to substantially ignore all compressional waves coming from the direction of the compression station 28, neither pair will activate the indicating means. Additionally, all compressional waves 52 generated by the compression station itself will be substantially ignored by all three pairs of transducers.

Thus the operator is rapidly warned of the existence of a vibrating condition or disturbance affecting the fluid in a particular pipeline, and he can quickly take the steps necessary to isolate such pipeline.

C. Modification of the Preferred Embodiment: One Transducer Means on each of a Plurality of Conductors And One Joint Transducer Means FIG. 7 illustrates schematically in horizontal cross-section the physical arrangement of the mechanical portion of a modification of the preferred embodiment of this invention employed on a plurality of interconnected pipelines. A single pipeline trunk 24 branches at a header 26 located downstream from a compression station 28 into three interconnected pipelines 30, 32 and 34. Rather than use a pair of transducer means on each of the pipelines 30, 32 and 34, a first transducer means 36, 40 and 44 is mounted on each of the conductors 30, 32 and 34, respectively, and a joint, trunk transducer means 45 is mounted on the pipeline trunk 24 upstream of the header 26. Each of the first transducer means 36, 40 and 44 preferably is positioned a preselected known distance X along the pipeline from the joint trunk transducer means 45; the distance X is measured along the longitudinal centerline of the pipeline from the pressure-sensitive element of the first transducer means to the pressure-sensitive element of the joint trunk transducer means. (Although each of the first transducer means is shown to be an equal distance X from the joint transducer means, each of the distance does not have to be equal so long as each of the distances is known.) The joint transducer means 45 functions in conjunction with each of the first transducer means 36, 40 and 44, respectively, to provide a directional detection device for each of the pipelines 30, 32 and 34, respectively. All compressional waves (viscous pressure waves if the fluid is a liquid, or, if the fluid is a gas, adiabatic pressure waves and viscous pressure waves) moving downstream from the compression station are substantially ignored or filtered. However, a compressional wave generated by a break or other condition in the pipelines such as the break 48 in pipeline 30, and moving upstream toward the first transducer means, will be detected.

An advantage of the modification of this invention illustrated in FIG. 7 is that the mechanical portion of the invention requires only four transducer means for a three-pipe junction, rather than six transducer means. This can result in a substantial savings in installation costs when the pipelines are buried in the earth.

D. Additional Embodiment of the Invention: Single-Transducer Means/Single-Conductor Another embodiment of this invention provides for rapid detection and indication of a vibrating condition or disturbance or break affecting gas contained in a conductor wherein the directional aspect of the above described preferred embodiment is not needed.

FIG. 8 shows schematically in horizontal cross-section the physical arrangement of the mechanical portion of such embodiment of this invention. A pipeline 54 has at least one of its ends closed by ordinary means 56. A transducing means 58, such as has been previously described, is secured by ordinary means in close relationship to said closing means 56 in such a manner that the pressure sensitive element of such transducing means 58 is in communication with the gas (not shown) contained in the pipeline. The transducing means 58 will detect compressional waves 60 (adiabatic pressure waves and viscous pressure waves) generated by a vibrating condition, such as a rupture or break 62, occurring along the pipeline. The output of the transducing means 58 will be utilized to determine the existence of the break by detecting the adiabatic pressure section of the compressional wave, which adiabatic pressure wave is moving through the gas at the speed of sound.

It is evident that this modification of the invention provides rapid warning to an operator of the existence of a vibrating condition or break affecting the gas contained in a closed conductor.

E. Additional Embodiment of this Invention: Plurality of Single Transducer Means/Plurality of Conductors Another method and apparatus for detecting vibrating disturbances or breaks affecting fluid contained in a plurality of interconnected pipelines according to this invention utilizes only one transducer means (rather than a pair) at a point on each pipeline. FIG. 9 shows in schematic horizontal cross-section the physical arrangement of the mechanical portions of such method and apparatus according to this invention. A single pipeline 64 branches at a header 66 located downstream from the compression station 68 into three interconnected pipelines 70, 72 and 74. Transducer means 76, 78 and 80 are secured by ordinary means to pipelines 70, 72 and 74, respectively. Unlike the positioning of the pairs of transducer means in the above described modification of the preferred embodiment, the positioning of the three transducing means 76, 78 and 80 with respect to each other is of importance. Each transducer means should be positioned so that a plane through the center of the pressure-sensitive element thereof and perpendicular to the longitudinal axis of the pipeline to which it is attached, is an equal distance Y along the longitudinal centerline of the pipeline from the center 82 of the juncture at which the pipelines branched. This is necessary in order that compressional waves (viscous pressure waves if the fluid is a liquid, or, if the fluid is a gas, adiabatic pressure waves and viscous pressure waves) generated by a vibrational condition or disturbance of the compression station 68 will be sensed simultaneously by each of the three transducer means 76, 78 and 80. The three transducer means 76, 78 and 80 function conjunctively to substantially ignore all compressional waves 84 emanating from the compression station 68 but to actuate indicating means responsive to compressional waves 86 generated by a vibrating condition, rupture, or break 87, occurring downstream in one of the pipelines indicating both the existence of such condition and the particular pipeline in which such condition occurred.

F. Block Diagram of Preferred Embodiment

Figure 10:
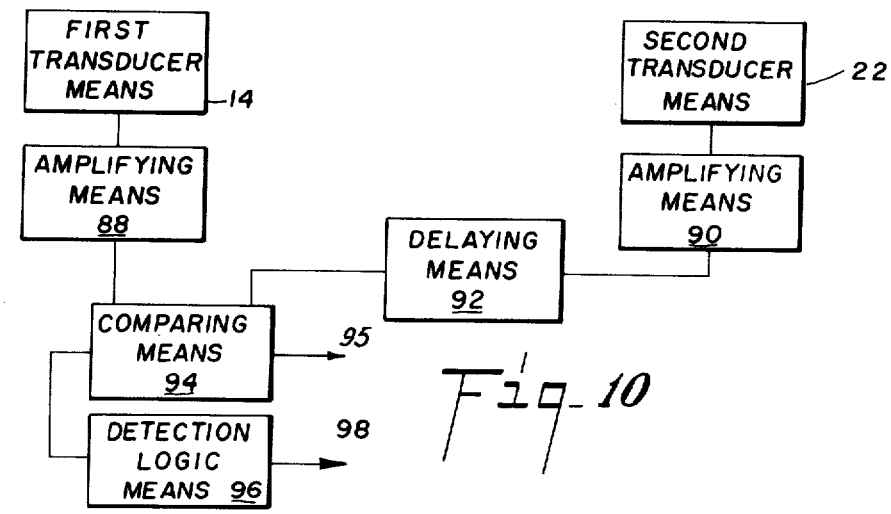
FIG. 10 is a block diagram of the various elements comprising the preferred apparatus the mechanical portions of which were illustrated in FIGS. 5 and 6.

FIG. 10 shows a block diagram of the preferred method and apparatus according to this invention for detecting and indicating the existence of a vibrating condition or break affecting fluid contained in a conductor. Changes in pressure detected by transducer means 14 and 22 are transformed to changes in voltage. The transducer means preferably is a dynamic-type piezoelectric pressure transducer, which utilizes the piezo-electric phenomenon to transform changes in pressure to changes in voltage without the use of mechanical linkage or the existence of any hysteresis, either of which can distort the voltage signal. Since the compressional waves are dynamic in nature, absolute pressure transducers are unnecessary, and, in fact, are less desirable. The adiabatic pressure wave at some distance from the break may be only a few tenths of a pound in magnitude and for a static transducer to resolve variations of tenths of pounds per square inch in the hundredths of psi normal line pressure would be difficult to perform reliably with reasonable signal to noise ratios. Such voltage signals are amplified by amplifying means 88 and 90, respectively. The output signal from amplifying means 90 is coupled to the input of delaying means 92, which functions to delay the emitting of such amplified voltage signal for a time duration substantially equal to the distance X between the pressure-sensitive elements in the transducing means 14 and 22 divided by the speed of sound (C) for the contained fluid.

The amplified voltage signal from amplifying means 88 is coupled along with the delayed amplified signal from delaying means 92 to the input of a comparing means 94, which functions to correlate the two voltage signals by comparing such voltage signals and amplifying and emitting only the difference in voltage between the voltage signal emitted from amplifying means 88 less the voltage signal emitted from delaying means 92. Since delaying the amplified voltage signal from transducer means 22 for a time period substantially equal to the distance X divided by the speed of sound allows substantially all such voltage signals responsive to pressure changes comprising the portions of a compressional wave moving downstream at the speed of sound to arrive at the input of the comparing means 94 at the same instant as the amplified voltage signals from the downstream transducer means 14 responsive to pressure changes comprising such compressional wave, substantially all voltage signals responsive to such compressional wave will be cancelled. If the fluid is a liquid, the compressional waves are viscous pressure waves which move at the speed of sound; they are completely canceled. If the fluid is a gas, the compressional waves may be adiabatic pressure waves or viscous pressure waves. The adiabatic pressure waves move at the speed of sound and are completely canceled. The viscous pressure waves travel at a velocity less than the speed of sound. However, due to the proximity of the upstream transducer means to the source of the viscous pressure waves (the compression station), the proximity of the two transducer means to each other, and the low frequency of the viscous pressure waves, the difference between the voltage signal of the downstream transducer means and the voltage signal of the upstream transducer means delayed for a time period equal to the distance X divided by the speed of sound, does not rise to a substantial level. Therefore, the only substantial voltage signals passed by the comparing means 94 are the voltage signals responsive to a compressional wave generated by a downstream disturbance.

The voltage signal, if any, emitted from the comparing means 94 is coupled to the input of the detection logic means 96 which functions to emit continuously a "logical" voltage signal responsive to said input signal. A logical voltage signal is one which represents one of the two integers existing in the binary number system (the numeric system with a radix of two). A voltage signal of amplitude less than the preselected "true/false threshold" voltage indicated a binary "0" or "false" signal while a voltage signal of amplitude greater than such "true/false threshold" voltage indicates a "1" or "true" signal. The detection logic means 96 emits continuously a voltage signal of first binary value until such time as a voltage signal whose absolute value exceeds a preselected magnitude is received from the comparing means 94. The preselected magnitude is chosen above the level of unrejected noise (such as caused by viscous pressure waves in a gas) and thus a voltage signal in excess of such magnitude can only result from the detection of a compressional wave generated downstream by a vibrating condition or break. At such time the detection logic means 96 commences to emit continuously over line 98 a voltage signal of the second binary value to activate an indicating means (not shown).

G. Schematic Drawing of the Preferred Embodiment

Figure 11:
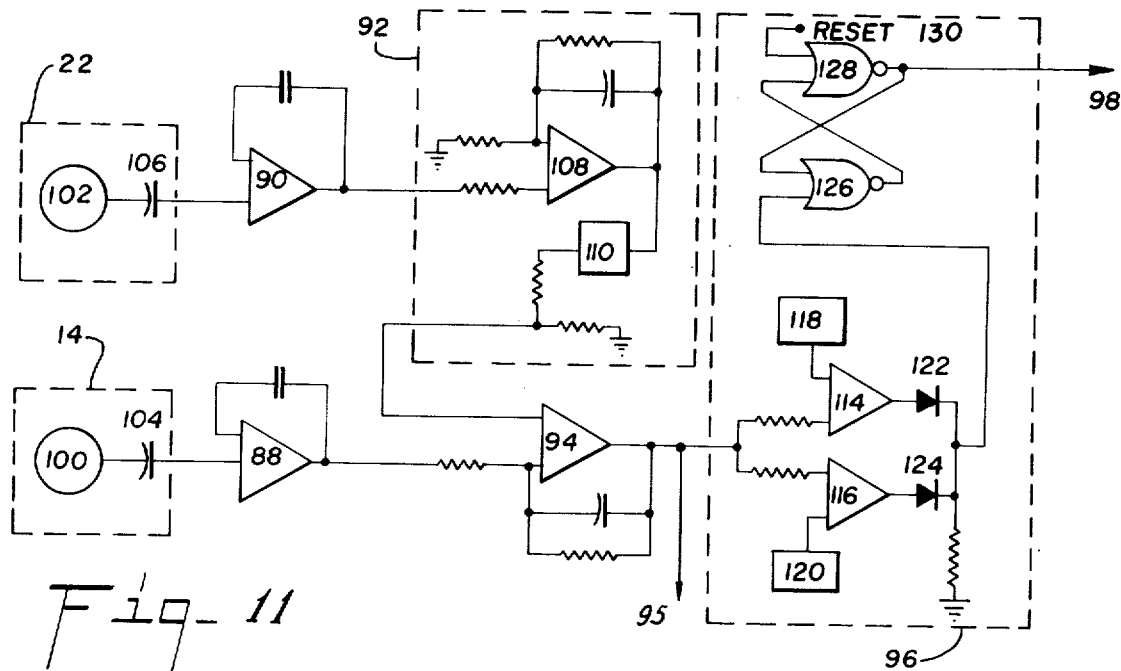
FIG. 11 is a schematic drawing showing a detailed, preferred electrical arrangement of the apparatus according to this invention shown in block diagram in FIG. 10.

FIG. 11 shows schematically a practical arrangement of the electrical components of the preferred method and apparatus according to this invention for detecting vibrating conditions and breaks in fluid conductors and actuating indicator means responsive thereto. The transducer means 14 and 22 are each shown in equivalent circuit form, that is, voltage sources 100 and 102 connected in series with the capacitances 104 and 106 which are inherent in such transducer means. The capacitances function to pass the A.C. component and filter the D.C. component of the voltage signals. When the pressure of the fluid stabilizes, the capacitance charges and the output of the transducer means is zero. Thus, even though the fluid pressure may have built up to some large value of absolute pressure, no voltage signal is emitted from the transducer means. The absolute value of the fluid pressure is not ascertained by such transducer means and is not even important in the method and apparatus of detecting vibrating conditions or breaks affecting contained fluids according to this invention. A voltage transient, however, will be easily passed by the capacitance and therefore emitted by the transducer means.

The voltage signals emitted from the transducer means 14 and 22 are coupled to the input of amplifying means 88 and 90, respectively, each of which acts as a buffer amplifier. Each of these buffer amplifiers is a standard device, such as a Motorola MC 1741 operational amplifier operated as either a charge amplifier or in a voltage-follower mode.

The output of amplifying means 90 is coupled to the input of the delaying means 92. A preferred embodiment of delaying means 92 includes an amplifying means 108 which functions only to amplify the voltage signal sufficiently to compensate for any decrease of signal caused by the delaying device 110. The amplifying means 108 is a standard device, such as a Motorola MC 1741 operational amplifier operated in a comparing mode. The delaying device 110 is a standard device such as one of Computer Devices Corp.'s numerous lump-constant delay lines or a digital storage device.

The output of the delaying means 92 is coupled, along with the output of the amplifying means 88, to the input of the comparing means 94. A preferred embodiment of comparing means 94 is a standard amplifying means, such as a Motorola MC 1741 operational amplifier operated in a comparing mode.

The output of the comparing means 94 is coupled to the input of the detection logic means 96, which functions to emit continuously a logical voltage signal of true binary value only when the absolute value of the voltage signal emitted from the comparing means 94 exceeds a preselected amplitude; otherwise it emits continuously a logical voltage signal of false binary value. A preferred embodiment of such detection logic means 96 includes two amplifying means 114 and 116, such as Motorola MC 1414L operational amplifiers operated in the comparing mode. These amplifying means 114 and 116 emit a voltage signal of only two values: a desired negative voltage or a desired positive voltage. The output of voltage means 118 and 120 is coupled to the input of the amplifying means 118 and 120 is coupled to the input of the amplifying means 114 and 116 respectively. Voltage means 118 and 120 are standard devices which emit continuously a desired preselected DC voltage signal. The output of comparing means 94, which will generally be a damping sinusoidal wave either initially negative-going or positive-going, is resistively coupled to the inputs of both amplifying means 114 and 116.

Amplifier means 114 functions to emit a voltage signal of negative value so long as the positive value of the voltage signal received from comparing means 94 does not exceed the positive DC voltage signal received from voltage means 118. Likewise, amplifier means 116 functions to emit a voltage signal of negative value so long as the negative value of the voltage signal received from comparing means 94 is not more negative than the value of the negative DC voltage signal received from voltage means 120. Such negative voltage signal emitted by either or both of such amplifying means 114 and 116 is blocked by the reversed-biased diodes 122 and 124 (standard devices such as 1N914 diodes), respectively.

The values chosen for the voltages emitted from voltage means 118 and 120 are a factor in the determining of the sensitivity of the entire method and apparatus. If no DC signal is emitted from voltage means 118 and 120, then any signal emitted by comparing means 94 will cause either amplifying means 118 or 120 (depending upon whether the voltage signal from comparing means 94 is positive-going or negative-going) to emit a positive voltage signal of preselected value. If voltage means 118 and 120 emit a signal of +1 and −1 volts, respectively, then no positive signal shall be emitted from amplifier means 114 or 116 until some portion of the voltage signal emitted from comparing means 94 exceeds such voltages.

Any positive voltage signal emitted by either amplifier means 114 or 116 and passed by diodes 122 or 124 respectively, is applied to the input of logical NOR gate 126. Logical NOR gates 126 and 128 operate as an R–S flipflop and function conjunctively to emit continuously over line 98 a logical voltage signal of false binary value until such time as logical NOR gate 126 senses a positive voltage signal from amplifier means 114 or 116. The logical NOR gates 126 and 128 then operate conjunctively to emit continuously over line 98 a logical voltage signal of true binary value, regardless of what signals are received from amplifier means 114 and 116, until reset by reset means 130 (not shown). The logical NOR gates are standard devices, such as Motorola MC 824P, each of which functions to emit continuously a logical voltage signal of true binary value only when both of its inputs are of false binary value; otherwise they each emit continuously a logical voltage signal of false binary value.

As has previously been stated, it is now believed that if the fluid is a liquid, all of the compressional waves moving downstream from the compression station comprise viscous pressure waves and will be canceled because such viscous pressure waves move at the speed of sound. If the fluid is a gas, the compressional waves moving downstream from the compression station comprise adiabatic pressure waves and viscous pressure waves. The adiabatic pressure waves will be canceled because they move through the gas at the speed of sound. The viscous pressure waves moving through gas generally travel at a velocity less than the speed of sound and they will not all be totally canceled. However, if the two transducer means are located relatively close to the source (the compression station) of such viscous pressure waves and the two transducer means are located relatively close to each other, the difference between the velocity at which the viscous pressure waves move from one transducer means to the other and the speed of sound will not be sufficient for such viscous pressure waves to obfuscate or to produce error in the detection of any adiabatic pressure waves moving in the other direction. This is clearly illustrated in FIG. 12.

Figure 12:
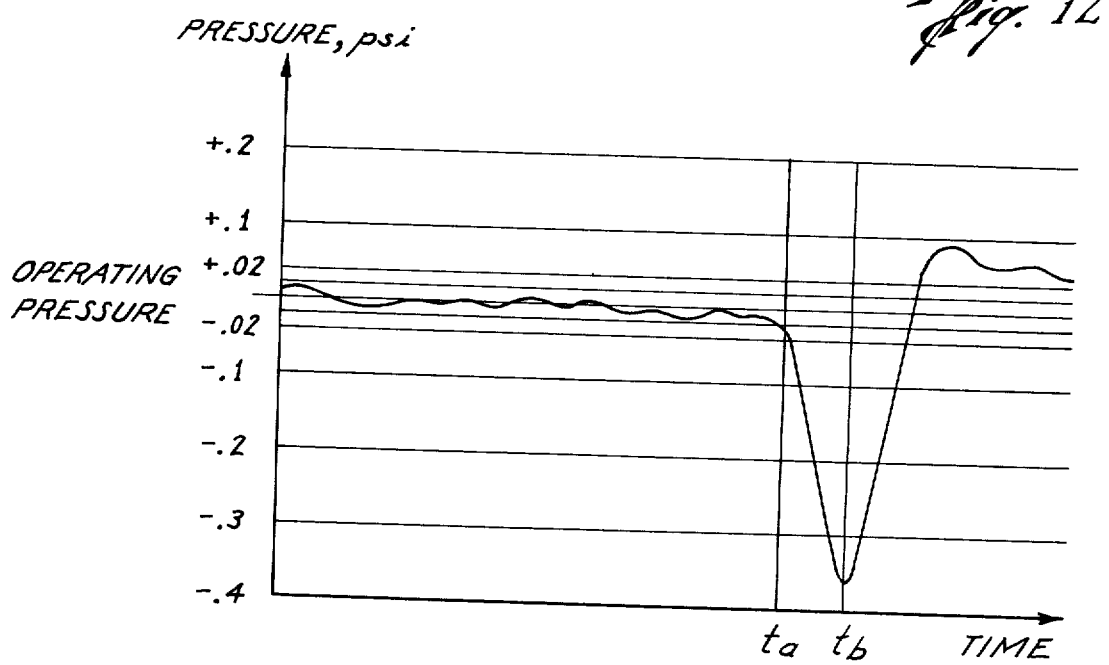
FIG. 12 illustrates graphically with respect to time the output of a comparing means (converted into pressure deviations) of an apparatus according to this invention employed at the same location and at the same time in the gas pipeline utilized to obtain the data illustrated graphically in FIG. 4.

FIG. 12 illustrates changes in pressure with respect to time correlating to the output of the comparing means 94 (the output of comparing means 94 is of course a voltage signal, but for purposes of FIG. 12, it has been correlated into a pressure signal) of an actual apparatus according to this invention utilized to monitor the changes in the pressure in the same gas at the same location and at the same time as the gas was monitored to produce the data illustrated in FIG. 4. The transducer means 22 was installed on the pipeline approximately 30 feet outside a header from the compression station. Transducer means 14 was installed on the pipeline approximately one hundred feet farther out. The delay means 110 was of a type such as described in copending application Ser. No. 260,585 entitled "Method and Apparatus for Delaying an Electrical Signal." Assuming one hundred feet between transducer means 14 and 22, the delay means 110 delayed the signals approximately 75 milliseconds. This delay was determined in accordance with the speed of sound through the gas in the pipeline.

The pipeline was 30 inches in diameter and contained gas at an operating pressure of approximately 650 psi in the vicinity of the compression station. To stimulate a break, an eight inch relief valve was placed on top of the blow down valve at the first cross-over location approximately 9 miles away. The blow down (which had a 5 inch throat) was opened to full open, and the relief valve was actuated by reducing the relief set point to below the line pressure at that time.

It should be noted that the scale of FIG. 12 is vastly different from the scale of FIG. 4: each division of pressure in FIG. 12 is 0.02 psi. Therefore, FIG. 12 is 50 times more sensitive to pressure changes than FIG. 4.

As evidenced by the portion of FIG. 12 prior to the point in time $t_n$, all pressure changes accompanying adiabatic pressure waves traveling from the compressor station to the two transducer means have been eliminated because the electrical signal produced by the upstream pressure transducer 22 is delayed for approximately 75 milliseconds to cancel adiabatic pressure waves moving at the speed of sound. Certain of the viscous pressure waves, moving at a velocity less than the speed of sound, have produced slight pressure fluctuations or noise. However, tests at compressor stations (turbine, centrifugal, vertical reciprocating and horizontal reciprocating) have shown that this unrejected noise does not exceed approximately 0.05 psi.

The adiabatic pressure wave section generated by the sudden opening of the relief valve was measured near the valve. It produced a pressure drop of approximately seven psi in 300 milliseconds. The rate of change of the pressure drop with respect to time produced by the adiabatic pressure wave decreased linearly as the adiabatic pressure wave moved along the pipeline. As shown in FIG. 12, when the adiabatic wave was detected at the compression station, the amplitude of the pressure drop had attenuated to approximately 0.3 psi. The rate of change of such pressure drop was approximately 0.3 pounds in 75 milliseconds.

FIG. 12 illustrates how the output of a direction detection apparatus according to this invention produces a signal indicative of the passing of the adiabatic pressure wave from the direction of the break towards the detection apparatus. Transducer means 14 is the first to transduce the pressure drop accompanying the adiabatic pressure wave and impresses the signal upon one input of the comparing means 94. Since the other transducer 22 has not reacted to this adiabatic pressure wave at the time, the comparing means 94 reflects a net result equal to whatever the input to transducer means 14 is at that time. Subsequently, the adiabatic pressure wave will travel to transducer means 22 and, through the delaying device 110, will eventually affect the output of the comparing means 94. However, the initial output of the comparing means 94 (commencing at time $t_n$ and extending until time $t_a$), reflects accurately the leading edge of the adiabatic pressure wave, that is, a signal evidencing the changes in the pressure of the gas during the time period it is expanding adiabatically. After this initial output, (after time $t_a$), the output of the comparing means 94 represents the pressure gradient between the transducer means 14 and 22 as if they were twice as far apart as they actually are.

It has been found that a limit of detection range is reached when the amplitude of the adiabatic pressure wave is so small that it is indistinguishable from the unrejected noise of the compression station. It has been found imperically that this limit for the above described pipe (assuming a 50 percent break which requires two seconds to occur) is approximately 72 miles. This has been validated by testing actual points at distances of 3.3, 7.7, 8.9, 11.6, 15.5 and 17.1 miles. The theortical amplitude of the adiabatic wave was calculated prior to each test, with the actual measured amplitude of each falling well within expected experimental error band.

H. Schematic Drawing of Embodiments Described in B, C, and D

A preferred arrangement of the electrical components in the embodiment of this invention disclosed in Section B may be described by referring to FIG. 11. Each of the pairs of transducer means preferably is coupled to a group of electrical components such as has been described in the discussion of FIG. 11.

A preferred arrangement of the electrical components in the embodiment of this invention disclosed in Section C may also be described with reference to FIG. 11. There are again three groups of electrical components such as have been described in the discussion of FIG. 11. The output of each of the first transducer means 30, 32 and 34, respectively, is coupled to the comparing means 94 of one of the groups of such electrical components. The output of the joint transducer means 45 is coupled to the delaying means 92 of each of the groups of electrical components.

A preferred arrangement of the electrical components in the embodiment of this invention described in Section D can also be described with reference to FIG. 11. The voltage signal emitted from transducer means 50 is coupled to the input of an amplifying means, such as amplifying means 88. Since there is no need for the delaying means 92 or the comparing means 94, the output of such amplifying means is coupled directly to the input of a detection logic means, such as detection logic means 32, which functions as previously described to activate an indicating means (not shown).

I. Block Diagram of Embodiment Described in E

Figure 13:
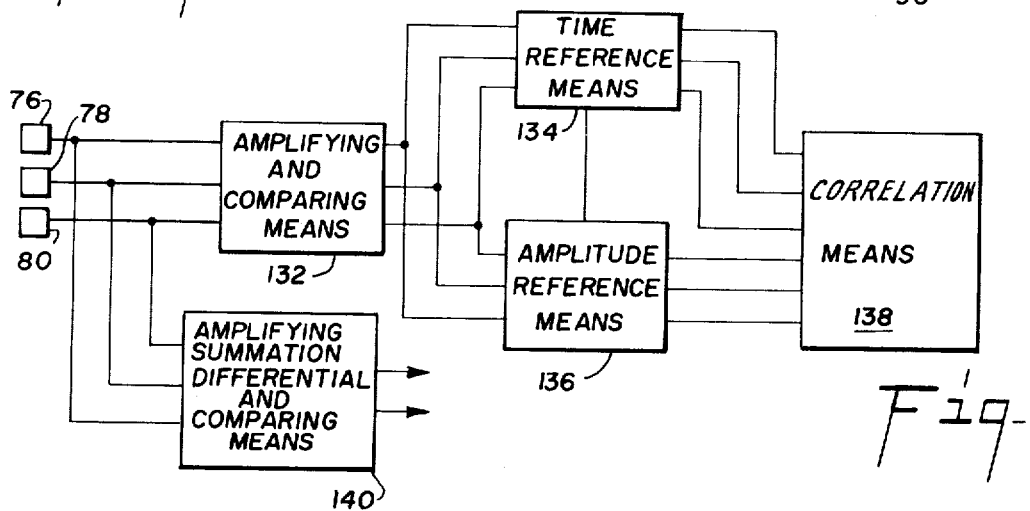
FIG. 13 is a block diagram of the various elements of the embodiment of this invention the mechanical portions of which were illustrated in FIG. 9.

FIG. 13 is a block diagram of the embodiment of the invention described in section E wherein a plurality of single transducer means are used in connection with a plurality of conductors, showing the general arrangement of the various elements and the contemplated method.

The voltage signal from each of the transducer means 76, 78 and 80 is coupled to the input of amplifying and comparing means 132 which functions to amplify each of the individual voltage signals received from the output of said transducer means 76, 78 and 80, and to emit over a line indicative of the proper transducing means any voltage signal that is not instantaneously common to all three of such voltage signals. The output of the amplifying and comparing means 132 is coupled both to the input of the time reference means 134 and to the input of the amplitude reference means 136.

It is important to note that the only voltage signals emitted by the amplifying and comparing means 132 are those irregular or uncommon voltage signals not common to and not sensed simultaneously by the other two transducer means. A compressional wave (a viscous pressure wave if the fluid is a liquid, or, if the fluid is a gas, an adiabatic pressure wave and viscous pressure wave) generated by the compression station 68 will be sensed by all three transducer means 76, 78 and 80 simultaneously, and therefore, the amplifying and comparing means 132 will not emit a voltage signal responsive to the changes of pressure accompanying such wave. But a vibrating condition, rupture or break 87 downstream in one of the pipelines will generate a compressional wave 86 (a viscous pressure wave if the fluid is a liquid, or, if the fluid is a gas, an adiabatic pressure wave and a viscous pressure wave) which will be sensed first only by the transducer means 76 attached to the pipe 70 in which the condition occurred. In a gas, the leading edge of the adiabatic wave produces pressure change of interest. At some later finite point in time ($t = 2Y/C$), depending upon the distance and the speed of sound for the fluid medium, the other two transducer means 78 and 80 will detect the changes of pressure accompanying such adiabatic portion of the compressional wave. Since these later changes of pressure are sensed by only two of the transducer means, the amplifying and comparing means 132 will emit a voltage signal responsive thereto.

The time reference means 134 functions to determine which of the transducer means 76, 78 and 80 first sensed the uncommon change in pressure not common to or sensed by all three transducer means. The time reference means 134 emits a logical signal of first binary value on the line corresponding to the transducer means which frist sensed the irregular pressure wave; a logical signal of second binary value is emitted on each of the other two output lines corresponding to the other two transducer means. Additionally, whenever the time reference means 134 receives any input signal, it emits a logical signal of first binary value which is transmitted to the input of the amplitude reference means 136 and functions to enable said amplitude reference means 136 for a preset time duration.

The amplitude reference means 136 functions to verify the results reached by the time reference means 134. The first voltage signal emitted on one of the outputs of the amplifying and comparing means 132, responsive to a compressional wave generated downstream by a vibrating condition or break, should have a positive amplitude greater than that of the voltage signals emitted on the other two outputs of such means 132. This is because the compressional wave generated by the break has to travel further before it is sensed by the other two transducer means and because of the reducing effects of the amplifying and comparing means 132. The amplitude reference means 136 functions to determine which one of such voltage signals had the greatest positive amplitude.

The amplitude reference means 136 is enabled only for that time duration necessary for the compressional wave generated by the break to move past all three transducer means. Since the time reference means 134 emits the signal which enables the amplitude reference means 136, and the time reference means 134 is triggered only when the first transducer means detects the uncommon compressional wave, it follows that the amplitude reference means should be enabled for a time duration slightly greater than 2 Y/C. After the amplitude reference means 136 is disabled, it emits a logical signal of first binary value on the line corresponding to the input line transmitting the voltage signal with the highest amplitude during the time period such means 136 was enabled. A logical signal of second binary value is emitted on the other two output lines.

The outputs of the time reference means 134 and the amplitude reference means 136 are coupled to the input of the correlation means 138 which functions to check the information received for consistency. If the voltage signal first emitted by the amplifying and comparing means 132 responsive to an uncommon compressional wave was also the voltage signal of highest positive amplitude, then the correlation means 138 emits a logical signal of first binary value on the appropriate line to a display means (not shown) to notify the operator that a vibrating condition or disturbance or break has been detected in that particular pipeline.

The signals received from transducer means 76, 78 and 80 are also coupled to the input of the amplifying, summation, differential and comparing means 140. Such means function to amplify the three voltage signals received from the transducer means, add such signals to result in one voltage signal, differentiate such total voltage signal with respect to time, and compare the differential of the voltage with zero volts to determine whether the pressure is increasing or decreasing in the plurality of pipelines. Although the amplifying, summation, differential and comparing means 140 could easily be made dependent upon the time reference means 134 (as is the case for the amplitude reference means 136), in the embodiment of the invention described herein such amplifying, summation differential and comparing means 140 is enabled at all times in order that the operators may continuously determine whether the pressure is increasing or decreasing in the plurality of pipelines.

J. Schematic Drawing of Embodiment Described in E

Figure 14:
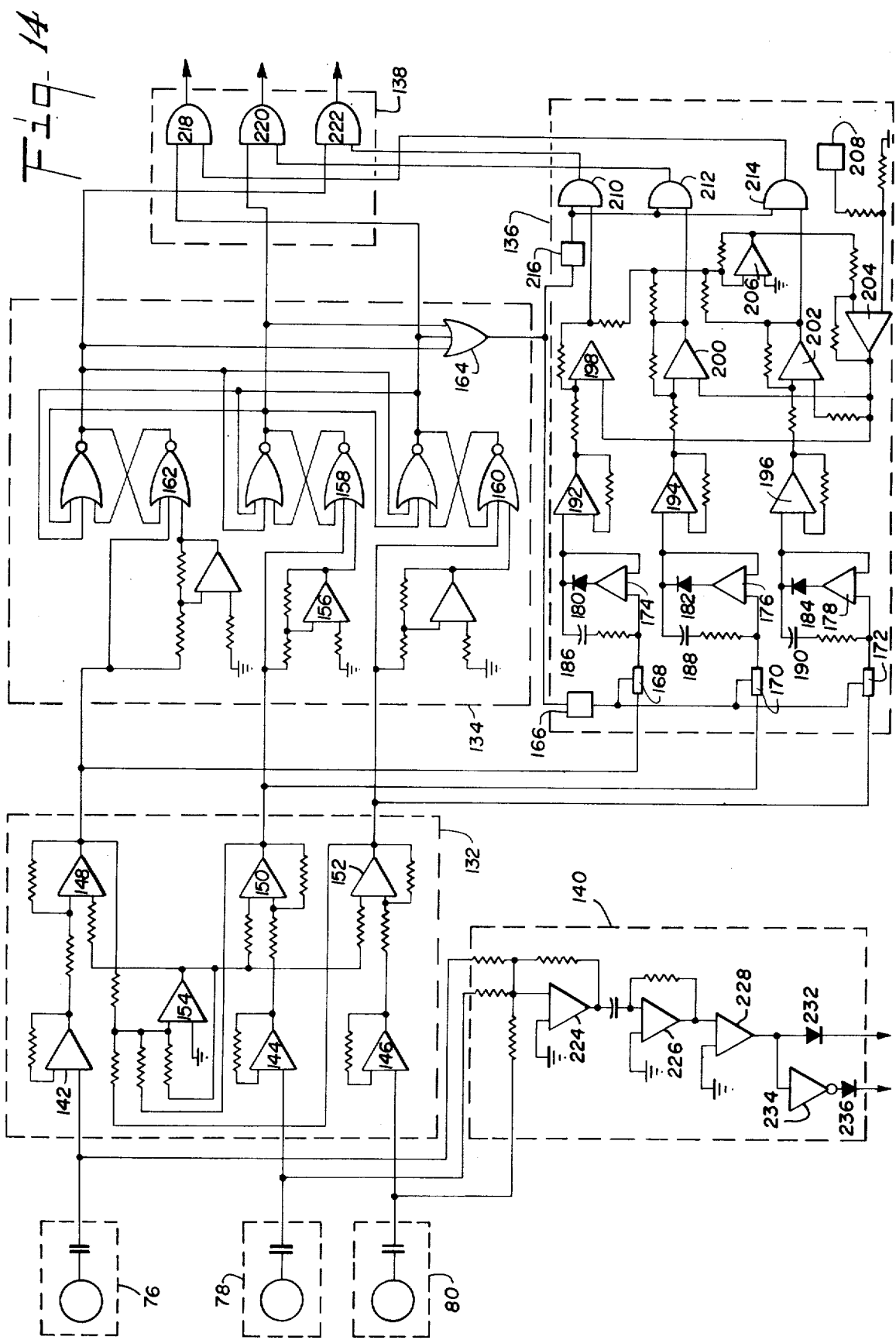
FIG. 14 is a schematic drawing showing a detailed, preferred electrical arrangement of the embodiment shown in the block diagram in FIG. 13.

FIG. 14 shows schematically a practical electrical arrangement of the embodiment of the invention described in Section E. Again each transducer means has been replaced with its equivalent circuit. The output of each transducer means 76, 78 and 80 is coupled to the input of the amplifying and comparing means 132 which is comprised chiefly of standard operational amplifiers functioning conjunctively to amplify and to compare the three voltage signals being received. Each voltage signal is first transmitted to the input of buffer amplifier means 142, 144 and 146, respectively. Each such buffer amplifier is a standard amplifying device, such as a Motorola MC 1741 operated in a voltage follower mode or as a charge amplifier.

The outputs of amplifying means 142, 144 and 146 are each coupled to the input of amplifying means 148, 150 and 152, respectively. Also coupled to the inputs of each of such amplifying means 148, 150 and 152 is a voltage signal received from still another amplifier means 154. Amplifier means 148, 150 and 152 each function to amplify and to emit a voltage signal responsive to the difference in its input voltages. Each of such amplifier means is a standard device, such as a Motorola MC 1741 operational amplifier operated in a comparing mode.

The outputs of the three amplifier means 148, 150 and 152 are coupled into the input of amplifier means 154 which functions to sum the voltage signals received at its input. Such amplifier means 154 is a standard device, such as a Motorola MC 1741 operational amplifier operating in a comparing mode. The output of amplifier means 154 is adjusted to be one-third of the magnitude of the summed outputs of amplifier means 148, 150 and 152. Thus, the amplifier means 148, 150 and 152, in conjunction with amplifier means 154, function to remove all common signals received from the transducer means; voltage signals unique to one or two of the transducer means are amplified and emitted. Of course, a voltage signal response to a compressional wave moving from the downstream direction and therefore unique to one of the amplifying means 148, 150 or 152 will have its amplitude diminished by one-third due to the operation of amplifier means 154. And after such compressional wave has moved through the header and is simultaneously sensed by the other two transducer means, the voltage signals emitted responsive thereto will be diminished in amplitude by two-thirds due to the operation of amplifier means 154.

The voltage signal initially emitted on one of the various outputs from the amplifying and comparing means 132 will generally commence as a positive-going or negative-going sinusoidal wave. However, very shortly thereafter, depending upon the distance Y between the transducer means and the speed of sound for the luid, the wave form emitted on such line will be distorted due to the effect of the other two transducer means detecting the compressional wave moving downstream and voltage signals being emitted on the other two lines. But this voltage signal, albeit distorted in its later stages, is sufficient for the purposes of the remainder of the circuitry.

Any voltage signal emitted on one of the outputs of the amplifying and comparing means 132 is coupled to the inputs of both the time reference means 134 and the amplitude reference means 136. The former means 134 functions to determine which one of the three transducer means 76, 78 or 80 first detected those changes in pressure which were not common to all three transducer means. In other words, it functions to determine on which output of the amplifying and comparing means 132 a voltage signal was first emitted.

A preferred arrangement of such time reference means 134 according to this invention is comprised of three identical circuits. For purposes of brevity, only one such circuit will be discussed in detail. Each output from the amplifying and comparing means 132 is applied both to the input of an inverter and the input of a logical NOR gate. Considering the output from amplifier means 150, such voltage signal is coupled to the input of amplifier means 156, a standard device which functions to invert the voltage wave form by emitting a voltage signal with magnitude equal to but polarity opposite from the input signal recieved. The voltage signal from the output of amplifier means 150 and the inverted voltage signal from the output of amplifier means 156 are then coupled to the input of logical NOR gate 158.

At this juncture the time reference means 134 commences to function as a "logical" device. The exact magnitude of any voltage signal emitted by the amplifying and comparing means 132 is material only to determine whether such voltage exceeds or not the preselected "true/false threshold" value of the logical NOR gates. All positive voltages less than the true/false threshold value (and hence all negative voltages) sensed by the input of the logical NOR gate constitute a logical signal of false binary value. All positive voltages of amplitude greater than the true/false threshold constitute logical signals of true binary value. Each of the three-input-logical NOR gates included in the time reference means 134 is a standard device which functions to emit a logical signal of thue binary value when all three of the inputs sensed by such logical NOR gate are of false binary value. On the other hand, when any one or more of such inputs are of a true binary value, the logical output of such NOR gate is of false binary value.

Each pair of such three-input-logical NOR gates in the time reference means 134 functions as a R–S flip-flop to emit continuously a logical signal of false binary value until such time as a voltage signal of true binary value is detected at any input to logical NOR gates 158, 160 or 162. At such time, the pair of logical NOR gates which first sense such signal commences to emit continuously a logical signal of true binary value. The other two pairs of logical NOR gates are prevented from switching from false to true and thus continue to emit a logical signal of false binary value. And all three pairs of logical NOR gates are "latched up" in such posture until reset (reset element not shown), irrespective of what voltage signals are emitted by the amplifying and comparing means 132. Thus, it is observed that until the circuitry is reset, time reference means 134 will recognize and transmit a logical signal responsive only to the first voltage signal emitted by the amplifying and comparing means 132.

The logical signals emitted from the three circuits comprising the time reference means 132 are transmitted to the input of the correlation means 138. Additionally, such signals are coupled to the input of a logical OR gate 164, a standard device which functions to emit continuously a logical signal of true binary value whenever it senses one or more input signals of true binary value; otherwise, it continuously emits an output signal of false binary value.

The voltage signal emitted by amplifier means 148, 150 and 152 is also coupled to the input of the amplitude reference means 136. Such means 136, however, is not receptive to signals emitting from the amplifying and comparing means 132 unless enabled by a logical signal of true binary value from the output of logical OR gate 164. The output of logical OR gate 164 is coupled to the input of one-shot means 166, a conventional apparatus which functions to emit continuously a signal of a desired binary value until it senses a desired transition of the signal applied to its input. At such instant the apparatus emits continuously a signal of the opposite binary value for a period of preset desired duration. Upon the expiration of such period, the output returns to its first binary value irrespective of the binary value of the input signal. In the preferred arrangement of the amplitude reference means 136, oneshot means 166, such as a Texas Instrument SN 74121 monostable, emits a signal of false binary value continuously until its input senses a change of signal from false to true binary value from the output of logical OR gate 164. At such time the output of one-shot means 166 emits a signal of true binary value for a time duration slightly greater than 2 Y/C.

The output of one-shot means 166 is applied to switching means 168, 170 and 172. Such switching means are conventional devices which function to close and therefore to pass the voltage signals received from the amplifying and comparing means 132 to the rest of the circuitry in the amplitude reference means 136 only during the time duration that the one-shot means 166 in applying a logical signal of true binary value to such switching means.

During the time duration the switching means 168, 170 and 172 are closed, all voltage signals emitted from the amplifying and comparing means 132 will be applied to the input of the amplifier means 174, 176 and 178. Each such amplifier means is a standard device, such as a Motorola MC 1741 operation amplifier operating as a peak reading amplifier, which functions to amplify the voltage signals imparted thereto. The diodes 180, 182 and 184 allow only the positive portions of the voltage signals emitted from the outputs of the three amplifier means to be applied across the capacitances 186, 188 and 190. When the one-shot means 166 "times out," the switching means 168, 170 and 172 will open and the capacitances 186, 188 and 190 will have stored thereon the highest positive voltages emitted from the three amplifier means 174, 176 and 178 during the time duration the switching means were closed. The voltages stored across the capacitances 186, 188 and 190 are applied to the inputs of buffer amplifier means 194, 194 and 196, respectively, which serve to amplify the voltage signal and to isolate the impedances of the capacitances from the remainder of the circuitry. These amplifier means are standard devices, such as Motorola MC 1741 operation amplifiers operating in the voltage follower mode or as charge amplifiers.

The voltage signals emitted from the outputs of the amplifier means 192, 194 and 196 are each coupled to the input of amplifier means 198, 200 and 202, respectively, each of which functions to amplify and to emit a voltage signal responsive to the difference in the voltage signal received from the appropriate amplifier means 192, 194 or 196 less the voltage signal received from amplifier means 204. Amplifier means 204 in turn functions to amplify and to emit a voltage signal responsive to the difference in the voltage signal received from the amplifier means 206 less the voltage signal received from the voltage means 208. Voltage means 208 is a standard device which functions to emit a constant DC voltage of desired amplitude. Finally, amplifier means 206 functions to sum the voltage outputs emitted by amplifier means 198, 200 and 202. Each of these amplifier means 198, 200, 202, 204 and 206 is a standard device such as a Motorola MC 1741 operational amplifier operating in the comparing mode.

Amplifier means 204 functions to apply a voltage signal to the inputs of each of amplifier means 198, 200 and 202 and thereby reduce the output voltage signals of each of amplifier means 198, 200 and 202 so long as the summed total of such output voltage signals, as emitted by amplifier means 206, exceeds the voltage signal emitted by voltage means 208. Voltage means 208 must be calibrated to emit a voltage signal of amplitude sufficient to exceed the true/false threshold level of the logical AND gates 210, 212 and 214. The voltage stored on capacitors 186, 188 and 190 must be amplified by amplifier means 192 & 198, 194 & 200, and 196 & 202, respectively, sufficiently so that when amplifier means 204 is no longer emitting a voltage signal, the only one of the amplifier means 198, 200 or 202 emitting a voltage signal of amplifier means 198, 200 or 202 emitting a voltage signal of amplitude in excess of the above stated true/false threshold level of the logical AND gates is the amplifier means responsive to the capacitance on which is stored the voltage of greatest positive amplitude.

When the circuitry in the amplitude reference means 136 has stabilized, whichever one of the amplifier means 198, 200 or 202 is indicative of the input line from the amplifying and comparing means 132 transmitting the voltage signal with highest positive amplitude while the switching means 168, 170 and 172 were enabled will emit continuously a logical signal of true binary value. The other two amplifier means will emit signals of false binary value. These voltage signals are coupled to the inputs of standard logical AND gates 210, 212 and 214, which conjunctively function to prevent any signal from passing until the circuitry of the amplitude reference means s stabilized. The logical AND gates are enabled by another one-shot means 216 which functions to emit continuously a signal of true binary value until triggered by logical OR gate 164 switching from false to true binary value. Then one-shot means 216 emits a signal of false binary value for a preset time duration. After timing out, one-shot means 216 again emits a signal of true binary value until triggered again. The time duration of one-shot means 216 should be in excess of 2 Y/C. Thus, while the switching means 168, 170 and 172 are enabled by one-shot means 166, the AND gates 210, 212 and 214 will be disabled by one-shot 216, a standard device such as a Texas Instrument SN74121 mono-stable.

The logical outputs of the amplitude reference means 136 are coupled to the input of the correlation means 138. Correlation means 138 is simply comprised of three logical AND gates 218, 220 and 222, each of which functions to receive and correlate a signal from the time reference means 134 and the amplitude reference means 136 which are responsive to the same output signal of the amplifying and comparing means 132 evidences the existence of a vibrating condition affecting the fluid in one of the plurality of pipelines. The true binary signal emitting from the time reference means 134 indicates which one of the transducers first sensed the compressional wave caused by such condition, and thus such logical signal indicates in which one of the pipelines the condition has occurred. The true binary signal emitting from the amplitude reference means 136 indicates which one of the transducers sensed the greatest change of pressure as the compressional wave caused by such condition swept by it. The transducer which first sensed the compressional wave should also sense the greatest change of pressure. And if such signals correctly correlate, the proper logical AND gate in the correlation means 138 emits a signal of true binary value which actuates an indicator means (not shown) and warns the operator that such condition has occurred.

The voltage signals generated by transducer means 76, 78 and 80 are also coupled to the input of the amplifying, summation, differential and comparing means 140. In the preferred arrangement of such means, the three voltage signals are initially coupled to the input of amplifier means 224, which functions to sum and to amplify such three voltages. Amplifier means 224 is a standard device, such as a Motorola MC 1741 operational amplifier operated in a comparing mode. The output voltage signal from amplifier means 224 is capacitively coupled to the input of another amplifier means 224 with respect to time. The voltage signal emitted by operational amplifier 226 is:

$$E_{226} = RC \frac{dE_{224}}{dt}$$

Such amplifier means is again a standard device, such as a Motorola MC 1741 operational amplifier operated in a differentiating mode.

The output of amplifier means 226 is coupled to the input of still another amplifier means 228, which functions as a comparator to determine if the changing voltage with respect to time is increasing or decreasing. In the preferred arrangement the voltage signal emitted by the amplifier means 226 is positive if the voltage is increasing with respect to time and is negative if the voltage is decreasing with respect to time. Amplifier means 228 then compares such signal with respect to ground and emits a signal of much larger negative or positive amplitude responsive thereto.

The output signal of the amplifier means 228 is coupled to the inputs of a diode 232 and an inverter means 234, both standard devices. The diode 232 functions to transmit any positive voltage signal received from the amplifier means 228 and actuates ann indicating means (not shown) notifying the operator that the pressure in the plurality of pipelines is increasing. Such diode 232 will not pass a negative voltage signal. The inverting means 234 functions to invert the voltage signal emitted from the amplifier means 228. Diode 236 then passes such inverted signal if it is positive, thereby activating indicating means (not shown) and warning the operator that the change in pressure in the plurality of pipelines is decreasing. The diode 236 will not pass an inverted negative voltage signal.

K. Additional Embodiment of this Invention: Telemetering Data

Figure 15:
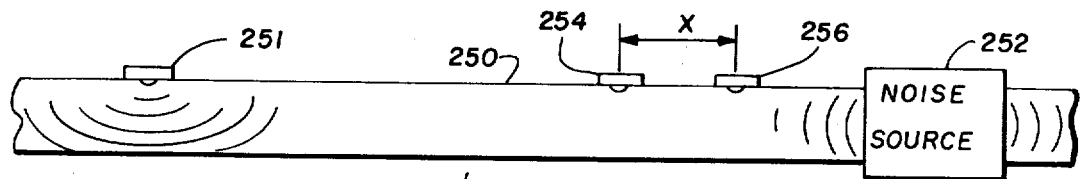
FIG. 15 is a horizontal cross-sectional schematic of the mechanical components of still another embodiment of this invention where data is telemetered through a contained gas.

Another embodiment of this invention is in a method and apparatus for telemetering data. FIG. 15 illustrates in schematic horizontal cross-section the physical arrangement of the preferred telemetering apparatus according to this invention. A conductor 250 contains gas in either a flowing or static condition. The conductor 250 communicates with the intake and output of some noise source 252, such as a compression station. At some selected point along the conductor 250, an input transducer means 251 is secured in such a position and manner that its element for imparting pressure to the fluid is in contact with the gas. Input transducer 251 may be any of numerous standard, commercially available devices which function to generate selectively discrete pressure pulses of a preselected magnitude. The magnitude should be sufficient to produce a rapid and significant change in the pressure of the gas. A first transducer means 254 and a second transducer means 256 are secured by ordinary means to the conductor between input transducer means 251 and noise source 252, preferably near noise source 252, in the positions and manner as previously described in part A. First and second transducers 254 and 256 are preferably of the piezoelectric or stain-gauge type and thus have no substantial mechanical elements. First and second transducers 254 and 256 and their attendant electronic circuitry, which will be hereinafter described, function conjunctively to detect the adiabatic pressure sections of compressional waves traveling through the contained gas from the direction of input transducer 251 while substantially filtering the adiabatic pressure sections and the viscous pressure sections of compressional waves traveling from the direction of noise source 252.

Figure 16:
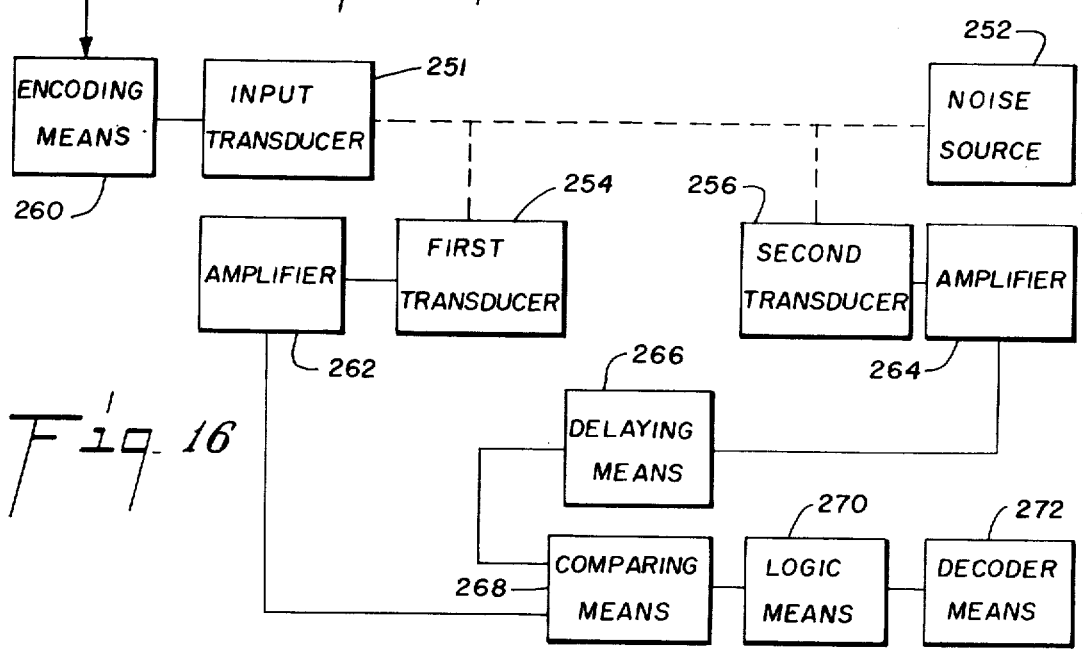
FIG. 16 is a block diagram of the various elements of the embodiment of this invention the mechanical components of which were schematically illustrated in FIG. 15.

FIG. 16 illustrates in block diagram format the preferred method and apparatus according to this invention for telemetering data. Data is transmitted to an encoding means 260 which functions to place the data in binary format. The encoding means 260 may be any of the numerous commercially available devices, such as an Analog Devices, Inc. ADC10H Analog-to-Digital Converter. The data in binary format is coupled to input transducer 251 which, as previously described, tranksduces each bit of data into one of either the presence or absence of a pressure pulse in the contained gas. These pressure pulses emanate at the speed of sound in all directions from input transducer 251 through the gas contained in the conductor 250. Likewise, compressional waves generated by noise source 252 are transmitted through the fluid in the conductor 250.

As previously described in part A, first and second transducers 254 and 256, respectively, detect transient changes in pressure in the fluid and generate first and second electrical signals, respectively, each of which has one of its parameters, preferably voltage, variable in magnitude proportional to the detected pressure. These first and second electrical signals are preferably amplified by amplifying means 262 and 264. The amplified second electrical signal generated by second transducer 256. The transducer positioned farthest away from input transducer 251, is coupled to a standard delaying means 266. Delaying means 266 functions to delay the emitting of such amplified second electrical signal for a time duration substantially equal to the distance (X) between the pressure-sensitive elements in the transducing means 254 and 256 divided by the speed of sound in the contained gas.

The amplified first electrical signal generated by first transducer 254 is coupled along with the delayed amplified second electrical signal generated by second transducer 256 to the input of a comparing means 268, which functions to correlate the two electrical signals by comparing such signals and amplifying and emitting a third electrical signal having the magnitude of one of its parameters, preferably voltage, equal to the difference therebetween. The output of comparing means 268 is coupled to the input of logic means 270 which, as described in part A, function to transform the third electrical signal sensed at its input into binary format. The output of logical means 270 is then coupled to the input of a decoder 272 which functions to transform the series of bits or absence thereof sensed at its input into some desirable format, such as the English language.

Figure 17:
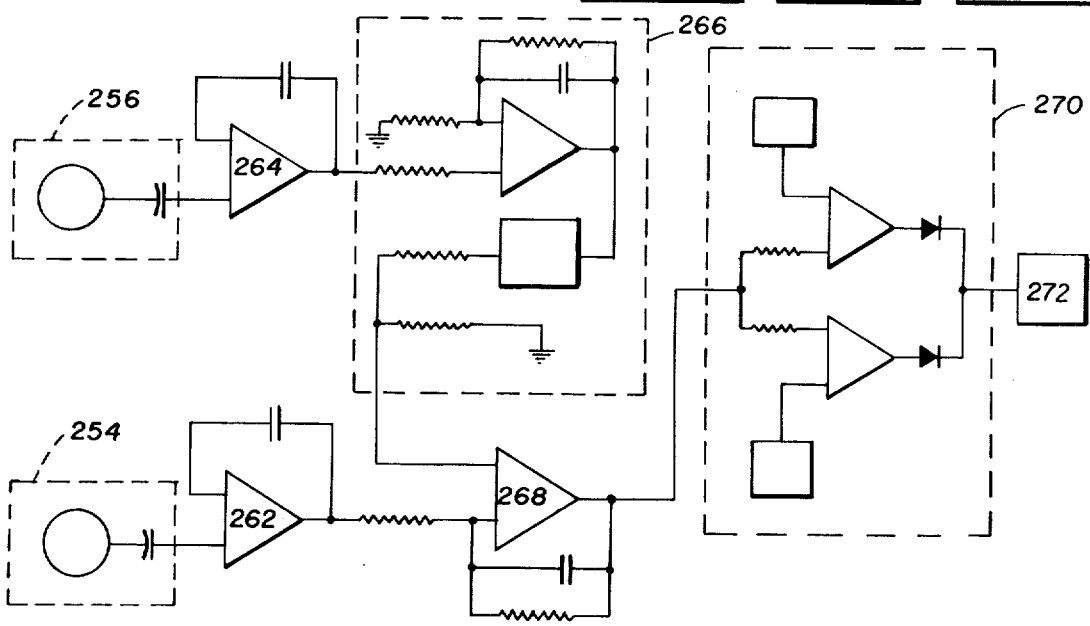
FIG. 17 is a schematic drawing showing a preferred electrical arrangement of the embodiment of this invention shown in block diagram in FIG. 16.

FIG. 17 illustrates schematically a practical electrical arrangement of the preferred method and apparatus according to this invention for telemetering data. First and second transducers 254 and 256, amplifiers 262 and 264, delaying means 266 and comparing means 268 are identical to the similar components described in part A. Logic means 270 is identical to a portion of the detection logic means 96 described in part A, which functions to transform the signal sensed at its input into a binary format. Decoder means 272 may be any of a plurality of standard commercially available devices, such as an Analog Devices, Inc. DAC8Q Digital-to-Analog Converter.

When the invention is utilized as described in Parts A–J to detect and indicate the existence of a break, rupture or other condition occurring in a fluid container, the pressure transducers and the attendant electrical circuitry function responsive to the wavefront of the compressional wave moving in the selected direction to actuate the indicating means. There is no need to detect any portion of the compressional wave except the wavefront. On the other hand, when the invention is applied to a method and apparatus for telemetry of data as described in this part, the transducers and electrical circuitry must detect the presence or absence of the leading edge of consecutive pressure pulses or compressional waves moving in the selected direction through the gas. A slight problem is presented by the fact that a compressional wave, in the form of a pressure pulse moving in the selected direction, is detected by the first transducer and slightly thereafter is detected by the second transducer and the output of the second transducer is then electrically delayed. To prevent a distorted signal being emitted by the comparing means, the rate at which the data pulses are transmitted through the fluid may simply be regulated to be slower than the time delay applied to the output of the second transducer.

L. Method and Apparatus for Determining Distance from Break in Gas Pipeline to Detection Apparatus This invention recognizes that the pressure variation produced by the leading edge of an adiabatic pressure wave at any point and at any time can be described as follows:

$$\frac{P}{P_0} = \left( \frac{2}{\gamma+1} + \frac{\gamma-1}{\gamma+1} \cdot \frac{V_0}{C_0} - \frac{\gamma-1}{\gamma+1} \cdot \frac{d}{C_0 t} \right)^{\frac{2\gamma}{\gamma-1}}$$

wherein $P_0$ is operating pressure of the pipeline, $V_0$ is velocity at which the gas is being moved through the pipeline, $C_0$ is speed of sound of the gas at rest with respect to the detecting means, $d$ is the distance from the location of the initial transducer to the break, $t$ is the time of arrival of the adiabatic pressure wave, and $\gamma$ is the ratio of the specific heat of the gas with the pressure held constant to the specific heat of the gas with the volume held constant.

If the pressure transducer 14 is at a distance $d$ from the break, then at the pressure transducer 14:

$$(1) \quad P = P_0 \left( \frac{2}{\gamma+1} + \frac{\gamma-1}{\gamma+1} \cdot \frac{V_0}{C_0} - \frac{\gamma-1}{\gamma+1} \cdot \frac{d}{C_0 t} \right)^{\frac{2\gamma}{\gamma-1}}$$

The distance from the break may now be determined by measuring the rate of change of pressure with respect to time:

$$(2) \quad \frac{dp}{dt} = P_0 \left( \frac{2\gamma}{\gamma-1} \right) \left( \frac{2}{\gamma-1} + \frac{\gamma-1}{\gamma+1} \cdot \frac{V_0}{C_0} - \frac{\gamma-1}{\gamma+1} \cdot \frac{d}{C_0 t} \right)^{\left(\frac{\gamma+1}{\gamma-1}\right)} \left(\frac{\gamma-1}{\gamma+1}\right) \left(\frac{d}{C_0 t^2}\right)$$

The time of arrival ($t_a$) of the adiabatic pressure wave can be determined from equation (2), which gives the position of the leading edge of the adiabatic wave:

$$(3) \quad t_a = \frac{d}{V_0 - C_0}$$

So that the initial rate of change of pressure is:

$$(4) \quad \left. \frac{dp}{dt} \right|_{t_a} = P_0 \left[ \left(\frac{2\gamma}{\gamma-1}\right) \left(\frac{\gamma-1}{\gamma+1}\right) \left(\frac{V_0 - C_0}{C_0 d}\right)^2 \right]$$

Therefore, if the rate of change of pressure of the adiabatic pressure wave is measured at a selected point, the distance from the break to that point can be determined.

When the embodiments of this invention described in sections A–H are used with a conductor containing gas, the output of the comparing means 94 preferably is, as illustrated in FIGS. 10 and 11, supplied over line 95 to means for solving equation (4) for $d$. The preferred embodiment of determining the distance between the detection apparatus and the break according to this invention utilizes electronics in the form of a digital computer, such as are well known to those skilled in the art, to determine the location of the break by utilizing the data from the comparing means 94 to solve equation (4). Of course, discrete electronics, such as is well known to those skilled in the art, could also be used to solve such equation.

M. Method and Apparatus for Determining the Location of a Break in a Pipeline Containing a Fluid and Occurring Between Two Correlated Pairs of Transducer Means FIG. 18 illustrates in schematic horizontal cross-section the embodiment of this invention described in section A utilized to determine the location along the pipeline of a break in a pipeline containing a fluid whether liquid or gas. The previously described $dp/dt$ characteristics of an adiabatic pressure wave in a gas, which allow the determination of distance by examination of its leading edge, are not applicable to the leading edge of a viscous pressure wave. The time required for a viscous pressure wave to travel through a liquid to a detection location and the pressure drop per unit of time for such viscous pressure wave depends not only on the viscosity of the liquid, but also on the size of the break and the distance between the break and the detection location. However, the viscous pressure wave generated by the break in the liquid and propagated through the liquid is detected at two locations on either side of the break, then the size of the break can be canceled from consideration.

Referring to FIG. 18, a pipeline 275 connects between compression or pumping stations 277 and 278. The direction of flow of the liquid is from pumping station 277 to pumping station 278. A first pair of transducer means 280 and 282 is secured to the pipeline adjacent pumping station 277 and functions to reject all viscous pressure waves generated by the pumping station 277 but to detect a viscous pressure wave generated by a break occurring somewhere along the pipeline. A second pair of transducer means 284 and 286 is secured to the pipeline adjacent pumping station 278 and functions to reject all viscous pressure waves generated by the pumping station 278 but to detect a viscous pressure wave generated by a break somewhere out along the pipeline. The viscous pressure waves generated by pumping station 278 will not be detected by transducer means 280, and viscous pressure waves generated by pumping station 277 will not be detected by transducer means 286, because such viscous pressure waves are too attenuated by the long distance between the pumping stations.

Assume now that a break 274 occurs somewhere along the pipeline at a point such that a viscous pressure wave 276 generated by the break and propagated through the liquid at the speed of sound may be detected by both pairs of transducer means. This invention recognizes that:

$$(5) \quad d = d_1 + d_2$$

$$(6) \quad d_1 = \frac{d - (C_0 - V_0)(t_{286} - t_{280})}{2}$$

$$(7) \quad d_2 = \frac{d - (C_0 - V_0)(t_{280} - t_{286})}{2}$$

where $C_0$ is the speed of sound of the gas at rest with respect to the detecting means, that is, the velocity at which the viscous pressure wave is moving through the liquid; $V_0$ is the velocity at which the gas is being moved through the pipeline; $d$ is the distance between pressure transducers 280 and 286; $t_{286}$ is the time of arrival of the viscous pressure wave at pressure transducer 286; and $t_{280}$ is the time of arrival at pressure transducer 280.

The average speed of sound of the viscous pressure wave through the liquid is:

$$(8) \quad C_0 = \left[ \frac{p}{g} \left( \frac{1}{P_{280}-P_{286}} + \frac{d}{b e} \right) \right]^{1/2}$$

where $p$ is the density of the liquid; $g$ is gravity; $d$ is the inside diameter of the pipeline; $b$ is the wall thickness of the pipeline; $e$ is the bulk modulus of elasticity of the liquid and as such includes the viscosity of the liquid; $P_{280}$ is the operating pressure of the liquid at pressure transducer 280; and $P_{286}$ is the operating pressure of the liquid at pressure transducer 286.

The electrical circuitry attendant to each of the pairs of pressure transducers 280 & 282 and 286 & 284 preferably is as described with respect to FIG. 11. The output of each such circuit is coupled to a clock apparatus (not shown) which records the time of arrival of the leading edge of the viscous pressure wave 276 at pressure transducer 280 and 286, respectively. The time of arrival data is then transmitted to a central location, such as by phone lines, and equations (6) and (8) and/or (7) and (8) are solved to determine the location of the break. These equations may be solved by discrete electronics or a computer as is well known to those skilled in the art. The break will be located within an accuracy of one or two percent.

Assume now that the pipeline 275 contains gas under pressure being moved from compression station 277 to compression station 278. Although the location of the break can be determined from the $dp/dt$ of the leading edge of the adiabatic wave generated by the break as has previously been explained, the location of the break can also be determined with an apparatus such as is illustrated in FIG. 18 wherein the time of arrival of the adiabatic wave is detected by pressure transducers on either side of the of the break. This invention recognizes that:

$$(9) \quad d = d_1 + d_2$$

$$(10) \quad d_1 = \frac{d - (C_0 - V_0)(T_{286} - T_{280})}{2}$$

$$(11) \quad d_2 = \frac{d - (C_0 - V_0)(T_{280} - T_{286})}{2}$$

$$(12) \quad d_1 = \frac{(R\gamma - \frac{V_0}{\gamma}) d + [(R\gamma - \frac{V_0}{\gamma})(T_{286}-T_{280})]^{1/2}}{2[(R\gamma - \frac{V_0}{\gamma})(T_{286}+T_{280})]}$$

$$(13) \quad d_2 = \frac{(R\gamma - \frac{V_0}{\gamma}) d + [(R\gamma - \frac{V_0}{\gamma})(T_{280} - T_{286})]^{1/2}}{2[(R\gamma - \frac{V_0}{\gamma})(T_{280}+T_{286})]}$$

where $d$ is the distance between pressure transducers 280 and 286; R is The Gas Constant; $\gamma$ is the ratio of the specific heat of the gas with the pressure held constant to the specific heat of the gas with the volume held constant; $T_{286}$ is the time of arrival of the adiabatic pressure wave at pressure transducer 286; $T_{280}$ is the time of arrival of the adiabatic pressure wave at pressure transducer 280; $C_0$ is the speed of sound of the gas at rest with respect to the detecting means, that is, the velocity at which the viscous pressure wave is moving through the liquid; and $V_0$ is the velocity at which the gas is being moved through the pipeline.

Again the electrical circuitry attendant to each of the pairs of pressure transducers is as described with respect to FIG. 11. The output of each such circuit is coupled to a clock apparatus (not shown). The times of arrival of the adiabatic pressure wave are correlated and equations (12) and/or (13) are solved by computer or discrete electronics to determine the location of the break.

CONCLUSION

Many variations in the forms of this invention will now be apparent to those skilled in the art. For example, the compressional waves generated by vibrating conditions or breaks may be detected by means other than the suggested piezo-electric pressure transducers. Different logic circuitry and means may be utilized to determine and correlate the emission of voltage signals. And elements of one method and apparatus may be combined with other methods and devices. For instance, the amplifying summation, differential and comparing means may well be used in connection with the preferred embodiment of its modification. It is felt, therefore, that the invention should not be limited to the illustrated embodiments, but rather by the scope and spirit of the invention defined in the appended claims.

What is claimed is:

1. In a pipeline containing gas under pressure, the method of rapidly detecting at a selected stationary monitoring point in the gas the existence of a distantly occurring break or other occurrence in the pipeline, which break or other occurrence produces a rapid and significant change in the pressure of the gas at the point of the break or other occurrence and causes an adiabatic pressure wave to propagate through the gas at the speed of sound, including the steps of:

continuously transducing transient changes of the pressure of the gas at the monitoring point in the gas into an electrical signal proportional thereto;

continuously monitoring the electrical signal and detecting the portion thereof representative of at least the leading edge of the adiabatic pressure wave created in the gas by the break or other occurrence and propagated through the gas at the speed of sound; and responsive to the detection of the portion of the electrical signal representative of the leading edge of the adiabatic pressure wave, activating means indicative of the existence of the break or other occurrence.

2. In a pipeline containing gas under pressure, the method of rapidly detecting the existence of a break or other occurrence in the pipeline in accordance with claim 1 and of rapidly determining the distance along the pipeline from the monitoring point to the break or other occurrence, including the additional step of:

determining from the portion of the electrical signal representative of the leading edge of the adiabatic pressure wave, the rate of change of the pressure of the gas at the monitoring point during at least a portion of the time the pressure of the gas changed adiabatically responsive to the passing of the adiabatic pressure wave.

3. In a pipeline containing gas under pressure, the method of rapidly detecting the existence of a break or other occurence in the pipeline and of rapidly determining the distance along the pipeline from the monitoring point to the break or other occurence, according to claim 2 and including the additional step of:

solving the following equation to determine the distance along the pipeline from the monitoring point to the break or other occurrence:

$$\left.\frac{dp}{dt}\right|_{t_a} = P_o\left[\left(\frac{2\gamma}{\gamma-1}\right)\left(\frac{\gamma-1}{\gamma+1}\right)\frac{(V_o-C_o)^2}{C_o d}\right]$$

wherein $dp/dt$ is the change in pressure of the gas with respect to time at the monitoring point during at least a portion of the time the pressure of the gas changed adiabatically responsive to the passing of the adiabatic pressure wave, $t_a$ is the time of arrival at the monitoring point of the leading edge of the adiabatic pressure wave created in the gas by the break or other occurence, $P_o$ is the operating pressure of the pipeline, $\gamma$ is the ratio of the specific heat of the gas with the pressure of the gas held constant to the specific heat of the gas with the volume of the gas held constant, $V_o$ is the velocity at which the gas is being moved through the pipeline, $C_o$ is the speed of sound of the gas at rest with respect to the monitoring point, and $d$ is the distance from the monitoring point to the break or other occurrence.

4. In a pipeline containing gas under pressure, in which the gas experiences transient changes in pressure at a selected stationary monitoring point due to noise or the like occurring along the pipeline in a selected direction from the monitoring point, the method of rapidly detecting at the monitoring point the existence of a break occurring distantly along the pipeline in the opposite direction from the monitoring point, which break produces a rapid and significant decrease in the pressure of the gas at the point of the break and causes an adiabatic pressure wave to propagate through the gas at the speed of sound, and of determining the distance along the pipeline between the monitoring point and the break, including the steps of:

continuously transducing transient changes of the pressure of the gas at the monitoring point into an electrical signal proportional thereto;

modifying the electrical signal to substantially eliminate the portion thereof representative of the transient changes in the pressure of the gas caused by the noise or the like occurring along the pipeline in the selected direction from the monitoring point;

continuously monitoring the modified electrical signal and detecting the portion thereof representative of at least the leading edge of the adiabatic pressure wave created in the gas by the break and propagated through the gas at the speed of sound; and determining from the portion of the modified electrical signal representative of the leading edge of the adiabatic pressure wave, the rate of change of the pressure of the gas at the monitoring point during at least a portion of the time the pressure of the gas changed adiabatically responsive to the passing of the adiabatic pressure wave.

5. In a pipeline system including a pipeline containing gas under pressure and extending from a compression station or the like which causes transient changes in the pressure of the gas at a first stationary monitoring point in the gas in the vicinity of the compression station, the method of rapidly detecting a break or other occurrence in the pipeline occurring along the pipeline on the opposite side of the first monitoring point from the compression station, which break or other occurence produces a rapid and signficiant change in the pressure of the gas at the point of the break or other occurrence and causes an adiabatic pressure wave to propagate through the gas at the speed of sound, wherein the transient changes in the pressure of the gas caused by the compression station are prevented from substantially interfering with the detection of the break or other occurrence, including the steps of:

detecting changes in the pressure of the gas at the first monitoring point in the gas and generating a first electrical signal proportional thereto;

detecting changes in the pressure of the gas at a second stationary monitoring point in the gas a selected distance from the first monitoring point along the pipeline toward the compression station and generating a second electrical signal proportional thereto;

delaying the second electrical signal for a period of time substantially equal to the distance along the pipeline between the first and second monitoring points divided by the speed of sound in the gas;

comparing the first electrical signal and the delayed second electrical signal and producing a third electrical signal which is representative of at least the leading edge of the adiabatic pressure wave created in the gas by the break or other occurence and propagated through the gas;

monitoring the third electrical signal and detecting the portions thereof representative of the leading edge of the adiabatic pressure wave created in the gas by the break or other occurrence and propagated through the gas; and responsive to the detection of such leading edge of the adiabatic pressure wave, activating means indicating the existence of the break or other occurrence.

6. In a pipeline system including a pipeline containing gas under pressure and extending from a compression station or the like which causes transient changes in the pressure of the gas at a first stationary monitoring point in the gas in the vicinity of the compression station, the method of rapidly detecting a break or other occurrence in the pipeline occurring somewhere along the pipeline on the other side of the monitoring point from the compression station, which break or other occurrence produces a rapid and significant change in the pressure of the gas at the point of the break or other occurrence and causes an adiabatic pressure wave to propagate through the gas at the speed of sound, wherein the transient changes in the pressure of the gas caused by the compression station are prevented from substantially interfering with the detection of the break or other occurrence, and of determining the distance between the break and the first monitoring point, according to claim 5 and including the additional steps of:

determining the change in pressure with respect to time of the substantially linear portion of the third electrical signal representative of the leading edge of the adiabatic pressure wave; and solving the following equation:

$$\left.\frac{dp}{dt}\right|_{t_a} = P_o\left[\left(\frac{2\gamma}{\gamma-1}\right)\left(\frac{\gamma-1}{\gamma+1}\right)\frac{(V_o-C_o)^2}{C_o d}\right]$$

wherein $dp/dt$ is the change in pressure of the gas with respect to time at the first monitoring point during at least a portion of the time of the pressure of the gas changed adiabatically responsive to the passing of the adiabatic pressure wave, $t_a$ is the time of arrival at the first monitoring point of the leading edge of the adiabatic pressure wave created in the gas by the break or other occurrence, $P_0$ is the operating pressure of the pipeline, $\gamma$ is the ratio of the specific heat of the gas with the pressure of the gas held constant to the specific heat of the gas with the volume of the gas held constant, $V_0$ is the velocity at which the gas is being moved through the pipeline, $C_0$ is the speed of sound of the gas at rest with respect to the first monitoring point, and d is the distance from the first monitoring point to the break or other occurrence.

7. In a gas conductor containing gas under pressure, the method of rapidly detecting and indicating the existence of a break in the conductor occurring somewhere along the conductor in a selected direction from a reference position, which break produces a rapid and significant decrease in the pressure of the gas at the point of the break and causes a compressional wave to be propagated through the gas in both directions from the break at the speed of sound, including the steps of:

detecting transient changes in the pressure of the gas at a first stationary point in the gas at the reference position;

detecting transient changes in the pressure of the gas at a second stationary point in the gas, the second point being located a known distance longitudinally along the conductor from the first point in the direction away from the break to be detected;

transforming the transient changes of pressure detected at the first point into a first electrical signal proportional thereto;

transforming the transient changes of pressure detected at the second point into a second electrical signal proportional thereto;

delaying the second electrical signal for a preselected time duration substantially equal to the distance between the first and second points divided by the speed of sound in the gas;

comparing the delayed second electrical signal with the first electrical signal and producing a third electrical signal comprised of the difference between the first electrical signal and the delayed second electrical signal; and actuating indicating means responsive to the third electrical signal to indicate the existence of the break which generates a compressional wave that passes the first point prior to passing the second point.

8. The method of rapidly detecting and indicating the existence of a rupture, break or other occurrence in a conductor containing gas under pressure, which rupture, break or other occurrence generates compressional waves through the gas contained in the conductor, wherein the rupture, break or other occurrence is detected at a first detection point longitudinally spaced in a preselected direction in the gas from the rupture, break or other occurrence, and wherein compressional waves traveling through the gas toward the first detection point from the opposite direction are not allowed to substantially interfere with the detection and indication, including the steps of:

detecting at the first detection point transient changes in the pressure of the gas and generating a first electrical signal proportional thereto;

detecting at a second detection point transient changes in the pressure of the gas and generating a second electrical signal responsive thereto, the second detection point being located a preselected distance longitudinally from the first point in the preselected direction;

delaying the second electrical signal for a time duration substantially equal to the preselected distance between the first and second detection points divided by the speed of sound in the gas;

comparing the first electrical signal and the delayed signal electrical signal and generating a third electrical signal proportional to the difference therebetween;

transforming the third electrical signal into a binary signal which is a preselected one of a first and second states whenever the absolute value of the third electrical signal exceeds a preselected threshold magnitude; and actuating indicating means responsive to the binary signal being of the preselected one of the first and second states.

9. In a pressurized gas pipeline system having a length of pipeline connecting between first and second compression stations or the like, each of which causes transient changes in the pressure of the gas in the vicinity thereof, the method of rapidly detecting the existence and determining the location of a break or other occurrence in the pipeline between the first and second compression stations, which break or other occurrence produces a rapid and significant change in the pressure of the gas at the point of the break or other occurrence and causes an adiabatic pressure wave to propagate through the gas at the speed of sound, wherein the transient changes in the pressure of the gas produced by the first and second compression stations are prevented from interfering substantially with detecting the break or other occurrence and determining its location, including the steps of:

detecting transient changes in the pressure of the gas at a first point in the gas in the vicinity of the first compression station and generating a first electrical signal proportional thereto;

detecting transient changes in the pressure of the gas at a second point in the gas in the vicinity of the second compression station and generating a second electrical signal proportional thereto;

detecting transient changes in the pressure of the gas at a third point in the gas a selected distance along the length of pipeline from the first point toward the first compression station and generating a third electrical signal proportional thereto;

detecting transient changes in the pressure of the gas at a fourth point in the gas a selected distance along the length of pipeline from the second point toward the second compression station and generating a fourth electrical signal proportional thereto;

delaying the third electrical signal a period of time substantially equal to the distance between the first and third points divided by the speed of sound in the gas;

delaying the fourth electrical signal a period of time substantially equal to the distance between the second and fourth points divided by the speed of sound in the gas;

comparing the first electrical signal and the delayed third electrical signal and producing a fifth electrical signal which is representative of at least the leading edge of the adiabatic pressure wave created in the gas by the break or other occurrence and propagated through the gas at the speed of sound;

comparing the second electrical and the delayed fourth electrical and producing the sixth electrical signal which is representative of at least the leading edge of the adiabatic pressure wave created in the gas by the break or other occurrence and propagated through the gas at the speed of sound;

monitoring the fifth electrical signal and determining the instant of time that the leading edge of the adiabatic pressure wave reached the first point in the gas;

monitoring the sixth electrical signal and determining the instant of time that the leading edge of the adiabatic pressure wave reached the second point in the gas; and solving either of the following equations:

$$d_1 = \frac{d - (C_0 - V_0)(t_{2K0} - t_{2K6})}{2}$$

$$d_2 = \frac{d - (C_0 - V_0)(t_{2K0} - t_{2K6})}{2}$$

wherein $d$ is the distance along the pipeline between the first and second points, $C_0$ is the speed of sound of the gas at rest with respect to the first and second points, $V_0$ is the velocity at which the gas is being moved through the pipeline, $t_{2K0}$ is the time of arrival of the leading edge of the adiabatic pressure wave at the first point, $t_{2K6}$ is the time of arrival of the leading edge of the adiabatic pressure at the second point, $d_1$ is the distance along the pipeline between the first point and the break or other occurrence, and $d_2$ is the distance along the pipeline between the second point and the break or other occurrence.

10. In a pressurized gas pipeline system having a plurality of individual piplesine interconnected together at a header or the like into a trunk pipeline, wherein the trunk pipeline extends from a compression station or the like which generates transient changes in the pressure of the gas in the vicinity of the compression station, the method of rapidly detecting the existence of a break or other occurrence occurring in one of the individual pipelines, which break or other occurrence produces a rapid and significant change in the pressure of the gas at the point of the break or other occurrence and causes an adiabatic pressure wave to progate through the gas at the speed of sound, including the steps of:

detecting changes in the pressure of the gas at a stationary point in each of the individual pipelines in the vicinity of the header and generating first electrical signal for each of the individual pipelines proportional to the detected changes in the pressure of the gas in the respective individual pipelines;

detecting changes in the pressure of the gas at a stationary point in the trunk pipeline and generating a trunk electrical signal proportional thereto;

delaying the trunk electrical signal for a selected period or periods of time, the trunk electrical signal being delayed, for each of the first electrical signals, a time period substantially equal to the pipeline distance between the stationary point in the respective individual pipeline and the stationary point in the trunk pipeline divided by the speed of sound at the gas;

comparing each of the first electrical signals with the respective delayed trunk electrical signal;

producing from each comparison a third electrical signal which is respresentative of the difference between the first electrical signal and the delayed trunk electrical signal;

monitoring each of the third electrical signals to detect the portion of the signal representative of the leading edge of the adiabatic wave generated by the break or other occurrence in the particular individual pipeline and propagated through the gas at the speed of sound; and responsive to the detection of a portion of the third electrical signals representative of the leading edge of the adiabatic pressure wave, activating means indicative of the existence of the break or other occurrence and the one of the individual pipelines in which the break or other occurrence occurred.

11. In a pipeline system including a plurality of pipelines containing gas under pressure and interconnected at a common point, the method of rapidly detecting in the vicinity of the common point, the existence of a distantly occurring break or other occurrence in one of the pipelines and of rapidly indicating in which one of the pipelines the break or other occurrence exists, which break or other occurrence produces a rapid and significant change in the pressure of the gas in the pipeline at the point of the break or other occurrence and causes a compressional wave to propagate at the speed of sound through the gas, including the steps of:

detecting changes in the pressure of the gas at a monitioring point in the gas in each of the plurality of interconnected conductors, each of the monitoring points being located in the respective conductor a known equal distance from the center of the interconnection of the plurality of conductors, the distance being measured along the center of the conductors;

transforming the pressure changes detected at each of the monitoring points into first plurality of electrical signals responsive thereto;

comparing the first plurality of electrical signals to produce a second plurality of electrical signals, each of which is responsive to one of the first plurality of electrical signals and is comprised of only those portions of the one of the first plurality of electrical signals to which it is responsive that are not common all of the first plurality of electrical signals;

comparing the second plurality of electrical signals to detect which one of the signals was first produced; and actuating indicating means responsive to the one of the second plurality of electrical signals first produced to indicate both the existence of the break or other occurrence generating the compressional wave and the particular conductor in which the break or other occurrence exists.

12. The method according to claim 11, including the additional steps of:

producing a first plurality of logical voltage signals indicative of which one of the second plurality of electrical signals was first produced;

comparing the second plurality of electrical signals to detect which one of the signals produced during a preselected time duration had the greatest positive amplitude, and producing a second plurality of logical voltage signals indicative of which one of the second plurality of electrical signals had the greatest positive amplitude during the preselected time duration;

comparing the first and second plurality of logical signals to detect correlation therebetween; and actuating indicating means responsive to the correlation if any betweem the first and second logical voltage signals to indicate both the existence of the break or other occurrence generating the compression wave and the particular conductor in which the break or other occurrence exists.

13. The method according to claim 11, including the additional steps of:

summing and amplifying the first plurality of electrical signals to produce a summed and amplified electrical signal;

differentiating with respect to time the summed and amplified electrical signal to produce a differentiated electrical signal;

comparing the differentiated electrical signal to zero voltage to determine whether the change in voltage if any with respect to time increasing or decreasing, and producing a compared electrical signal responsive thereto; and actuating indicating means responsive to the compared electrical signal.

14. In a pipeline containing gas under pressure, an apparatus for rapidly detecting at a selected stationary monitoring point the existence of a break or other occurrence occurring distantly in the pipeline, which break or other occurrence produces a rapid and significant change in the pressure of the gas at the point of the break or other occurrence and causes an adiabatic pressure wave to propagate through the gas at the speed of sound, comprising:

pressure/electrical transducer means connected to the pipeline and in communication with the gas at the monitoring point for continuously transducing transient changes of the pressure of the gas into a first electrical signal proportional thereto;

means coupled to the output of the transducer means for continuously monitoring the first electrical signal to detect a portion thereof representative of at least the leading edge of the adiabatic pressure wave created in the gas by the break or other occurrence and propagated through the gas and for generating a second electrical signal indicative thereof; and means coupled to the output of the monitoring means for indicating, responsive to the second electrical signal, the existence of the break or other occurrence.

15. In a pipeline containing gas under pressure, an apparatus for rapidly detecting at a selected stationary monitoring point the existence of a break or other occurrence occurring distantly in the pipeline, according to claim 14, and for rapidly determining the distance between the break or other occurrence and the monitoring point in the gas, wherein the means for continuously monitoring the first electrical signal includes:

means for determining from the first electrical signal the rate of change in the pressure of the gas as the pressure of the gas changed adiabatically during a portion of the time that the leading edge of the adiabatic pressure wave was passing the monitoring point; and means coupled to the output of the determining means for solving the following equation:

$$\left. \frac{dp}{dt} \right|_{t_a} = P_a \left[ \left( \frac{2\gamma}{\gamma-1} \right) \left( \frac{\gamma-1}{\gamma+1} \right) \frac{(V_0-C_0)^2}{C_0 d} \right]$$

wherein $dp/dt$ is the change in pressure of the gas with respect to time at the monitoring point during at least a portion of the time the pressure of the gas changed adiabatically responsive to the passing of the adiabatic pressure wave, $t_a$ is the time of arrival at the monitoring point of the leading edge of the adiabatic pressure wave created in the gas by the break or other occurrence, $P_0$ is the operating pressure of the pipeline, $\gamma$ is the ratio of the specific heat of the gas with the pressure of the gas held constant to the specific heat of the gas with the volume of the gas held constant, $V_0$ is the velocity at which the gas is being moved through the pipeline, $C_0$ is the speed of sound of the gas at rest with respect to the monitoring point, and $d$ is the distance from the monitoring point to the break or other occurrence.

16. In a length of pipeline containing gas under pressure and extending from a compression station or the like which causes transient changes in the pressure of the gas at a selected stationary first monitoring point in the length of pipeline, an apparatus for rapidly detecting at the first monitoring point a break or other occurrence distantly occurring in the pipeline on the opposite side of the first monitoring point from the compression station, which break or other occurrence produces a rapid and significant change in the pressure of the gas at the point of the break or other occurrence and causes an adiabatic pressure wave to propagate through the gas at the speed of sound, comprising:

means for detecting transient changes in the pressure of the gas at the first monitoring point in the gas and for generating a first electrical signal proportion thereto;

means for detecting transient changes in the pressure of the gas at a second stationary monitoring point in the gas selected distance along the pipeline from the first point toward the compression station and for generating a second electrical signal proportional thereto;

means coupled to the output of the second detecting and generating means for delaying the second electrical signal for a period of time substantially equal to the distance along the pipeline between the first and second points divided by the speed of sound in the gas;

means coupled to the output of the delay means and the first detecting and generating means for comparing the first electrical signal and the delayed second electrical signal and for producing a third electrical signal proportional to the difference therebetween, which third electrical signal is representative of at least the leading edge of the adiabatic pressure wave generated in the gas by the break or other occurrence and propagated through the gas at the speed of sound;

means coupled to the output of the comparing means for monitoring the third electrical signal and for detecting the portion thereof representative of the leading edge of the adiabatic pressure wave generated in the gas by the break or other occurrence and propagated through the gas at the speed of sound; and means coupled to the output of the monitoring means for indicating the existence of the break or other occurrence.

17. In a pipeline containing gas under pressure and extending from a compression station or the like which causes transient changes in the pressure of the gas at a selected stationary first monitoring point in the length of pipeline, an apparatus for rapidly detecting at the first monitoring point a break or other occurrence distantly occurring in the pipeline on the opposite side of the first monitoring point from the compression station, which break or other occurrences produces a rapid and significant change in the pressure of the gas at the point of the break or other occurrence and causes an adiabatic pressure wave to propagate through the gas at the speed of sound, according to claim 16, and for determining the distance between the break or other occurrence and the first monitoring point, including:

means coupled to the output of the comparing means for determining from the third electrical signal, the change in the pressure of the gas with respect to time during at least a portion of the time the pressure of the gas changed adiabatically responsive to the leading edge of the adiabatic pressure waves passing the first monitoring point; and means coupled to the output of the determining means for solving the following equation:

$$\left. \frac{dp}{dt} \right|_{t_a} = P_0 \left[ \left( \frac{2\gamma}{\gamma-1} \right) \left( \frac{\gamma-1}{\gamma+1} \right) \frac{(V_0-C_0)^2}{C_0 d} \right]$$

wherein $dp/dt$ is the change in pressure of the gas with respect to time at the monitoring point during at least a portion of the time the pressure of the gas changed adiabatically responsive to the passing of the adiabatic pressure wave, $t_a$ is the time of arrival at the first monitoring point of the leading edge of the adiabatic pressure wave created in the gas by the break or other occurrence, $P_0$ is the operating pressure of the pipeline, $\gamma$ is the ratio of the specific heat of the gas with the pressure of the gas held constant to the specific heat of the gas with the volume of the gas held constant, $V_0$ is the velocity at which the gas is being moved through the pipeline, $C_0$ is the speed of sound of the gas at rest with respect to the first monitoring point, and $d$ is the distance from the first monitoring point to the break or other occurrence.

18. An apparatus for rapidly detecting and indicating the existence of a break or other occurrence in a gas conductor containing gas under pressure, which break or other occurrence occurs in the gas conductor somewhere along the conductor in a selected direction from a reference position and which break or other occurrence produces a rapid and significant change in the pressure of the gas at the point of the break or other occurrence and causes a compressional wave to be propagated at the speed of sound through the gas contained in the conductor, comprising:

a first pressure/electrical transducer for detecting transient changes in the pressure of the gas and generating an electrical signal proportional thereto, the first transducer being in communication with the gas at a first point located at the reference position;

a second pressure/electrical transducer for detecting transient changes in the pressure of the gas at a second point in the gas and for generating a second electrical signal proportional thereto, the second point being located in the gas a known distance along the pipeline from the first point on the opposite side of the reference position from the break or other occurrence to be detected;

means coupled to the output of the second transducer for delaying the second electrical signal for a preselected time duration substantially equal to the distance between the first and second points divided by the speed of sound in the gas;

means coupled to the output of the first transducer and the delay means for comparing the delayed second electrical signal and the first electrical signal and for producing a third electrical signal comprising the difference between the first electrical and the delayed second electrical signal; and means coupled to the output of the comparing means for indicating, responsive to the third electrical signal, the existence of the break or other occurrence which generates a compressional wave that passes the first point prior to passing the second point.

19. An apparatus according to claim 18, comprising:

means for differentiating with respect to time the third electrical signal to produce a differentiated electrical signal;

means for comparing the differentiated electrical signal to zero voltage to detect whether the change of voltage if any with respect to time is increasing or decreasing and to produce a compared electrical signal; and means responsive to the compared electrical signal to indicate whether the pressure is increasing or decreasing.

20. An apparatus for rapidly detecting and indicating the existence of a rupture, break or other condition in a gas conductor, which rupture, break or other condition generates compressional waves through the gas contained in the conductor, wherein the rupture, break or other occurrence is detected at a first detection point longitudinally spaced in a preselected direction in the gas from the rupture, break or other condition and wherein compressional waves traveling through the gas toward the first detection point from the opposite direction are prevented from substantially interfering with the detection and indication, comprising:

means positioned in the gas at the first detection point for detecting transient changes in the pressure of the gas and for generating a first electrical signal proportional thereto;

means positioned at a second detection point in the gas for detecting transient changes in the pressure of the gas and for generating a second electrical signal responsive thereto, the second detection point being located at a preselected distance longitudinally from the first point in the preselected direction;

the first electrical signal and the second electrical signal each having a preselected one of its parameters of voltage and current proportional in magnitude to the change in the pressure of the gas at the first and second detection points, respectively;

means for delaying the second electrical signal for a time duration substantially equal to the preselected distance between the first and second detection points divided by the speed of sound in the gas;

means for comparing the first electrical signal and the delayed second electrical signal and for generating a third electrical signal proportional to the differnce therebetween, the comparing means including:

means for comparing the magnitudes of the first and second electrical signals to determine the difference therebetween, and means for generating a third electrical signal having a preselected one of its parameters of voltage and current proportional in magnitude to such differences; and means connected to the output of the comparing means for indicating responsive to the third electrical signal the existence of the rupture, break or other condition, the indicating means including:

means for transforming the third electrical signal into a binary signal, and means responsive to a preselected one of the first and second states of the binary signal for indicating the existence of the rupture, break or other condition.

21. In a pressurized gas pipeline system having a length of pipeline connected between first and second compression stations or the like, each of which causes transient changes in the pressure of the gas in the vicinity thereof, an apparatus for rapidly detecting a break or other occurrence occuring in the length of pipeline somewhere between the first and second compression stations and for rapidly determining the location of the break or other occurrence along the length of pipeline between the first and second compression stations, which break or other occurrence produces a rapid and significant change in the pressure of the gas at the point of the break or other occurrence and causes an adiabatic pressure wave to propagate through the gas at the speed of sound, comprising:

a first pressure/electrical transducer for detecting transient changes in the pressure of the gas at a first point in the gas in the length of pipeline in the vicinity of the first compression station and for generating a first electrical signal proportional thereto;

a second pressure/electrical transducer for detecting transient changes in the pressure of the gas at a second point in the gas in the length of pipeline in the vicinity of the second compression station and for generating a second electrical signal proportional thereto;

a third pressure/electrical transducer for detecting transient changes in the pressure of the gas at a third point in the gas in the length of pipeline a selected distance along the length of pipeline from the first point toward the first compression station and for generating a third electrical signal proportional thereto;

a fourth pressure/electrical transducer for detecting transient changes in the pressure of the gas at a fourth point in the gas in the length of pipeline a selected distance along the length of pipeline from the second point toward the second compression station and for generating a fourth electrical signal proportional thereto;

first delay means coupled to the output of the third transducer for delaying the third electrical signal a period of time substantially equal to the distance between the first and third points divided by the speed of sound in the gas;

second delay means coupled to the output of the fourth transducer for delaying the fourth electrical signal a period of time substantially equal to the distance between the second and fourth points divided by the speed of sound in the gas;

first comparing means coupled to the outputs of the first transducer and the first delay means for comparing the first electrical signal and the delayed third electrical and for producing a fifth electrical signal which is representative of at least the leading edge of the adiabatic pressure wave generated in the gas by the break or other occurrence and propagated through the gas at the speed of sound;

second comparing means coupled to the outputs of the second transducer and the second delay means for comparing the second electrical signal and the delayed fourth electrical signal and for producing a sixth electrical signal which is representative of at least the leading edge of the adiabatic pressure wave generated in the gas by the break or other occurrence and propagated through the gas at the speed of sound;

means coupled to the output of the first comparing means for monitoring the fifth electrical signal and for determining the instant of time that the leading edge of the adiabatic pressure wave reaches the first point in the gas;

means coupled to the output of the second comparing means for monitoring the sixth electrical signal and for determining the instant of time that the leading edge of the adiabatic pressure wave reaches the second point in the gas; and means for solving either of the following equations:

$$d_1 = \frac{d - (C_0 - V_0)(t_{286} - t_{280})}{2}$$

$$d_2 = \frac{d - (C_0 - V_0)(t_{280} - t_{286})}{2}$$

wherein $d$ is the distance along the pipeline between the first and second points, $C_0$ is the speed of sound of the gas at rest with respect to the first and second points, $V_0$ is the velocity at which the gas is being moved through the pipeline, $t_{280}$ is the time of arrival of the leading edge of the adiabatic pressure wave at the first point, $t_{286}$ is the time of arrival of the leading edge of the adiabatic pressure at the second point, $d_1$ is the distance along the pipeline between the first point in the break or other occurrence, and $d_2$ is the distance along the pipeline between the second point and the break or other occurrence.

22. In a pressurized gas pipeline system having a plurality of individual pipelines interconnected together at a header or the like into a trunk pipeline, wherein the trunk pipeline extends from a compression station or the like which generates transient changes in the pressure of the gas in the vicinity of the header, an apparatus for rapidly detecting in the vicinity of the header the existence of a break or other occurrence occurring in one of the individual pipelines, which break or other occurrence produces a rapid and significant change in the pressure of the gas at the point of the break or other occurrence and causes an adiabatic pressure wave to propagate through the gas at the speed of sound, comprising:

- a first pressure/electrical transducer in communication with the gas at a stationary monitoring point in each of the individual pipelines in the vicinity of the header for detecting transient changes in the pressure of the gas and generating a first electrical signal proportional thereto for each of the individual pipelines;
- a trunk pressure/electrical transducer in communication with the gas at a stationary monitoring point in the trunk pipeline for detecting transient changes in the pressure of the gas and generating a trunk electrical signal proportional thereto;
- means coupled to the output of the trunk transducer for delaying the trunk electrical signal for a selected period or periods of time, the trunk electrical signal being delayed for each of the first electrical signals a time period substantially equal to the distance between the respective stationary monitoring point in the individual pipeline and the stationary monitoring point in the trunk pipeline divided by the speed of sound in the gas;
- a comparing means for each of the first transducers coupled to the output of the delaying means and to a respective one of the first transducers for comparing the respective first electrical signal and the respective delayed trunk signal and generating a compared electrical signal proportional to the difference therebetween; and
- means coupled to the output of each of the comparing means for monitoring each of the compared electrical signals and for detecting the portion of any such compared electrical signal representative of the compressional wave created in the gas in one of the pipelines by the break in such pipeline and propagated through such gas toward the header; and
- means coupled to the output of the monitoring means for indicating the existence of the break and the particular pipeline in which the break occurred.

23. In a pipeline system including a plurality of pipelines interconnected at a common point and containing gas under pressure, an apparatus for rapidly detecting in the vicinity of the common point the existence of a distantly occurring break or other occurrence in one of the pipelines and for indicating in which one of the pipelines the break or other occurrence occurred, which break or other occurrence produces a rapid and significant change in the pressure of the gas at the point of the break or other occurrence and causes a compressional wave to propagate at the speed of sound through the gas, comprising:

- transducer means positioned at a monitoring point in each of the plurality of pipelines in the vicinity of the interconnecting common point for monitoring transient changes in the pressure of the gas and for transducing such transient changes in the pressure into a proportional electrical signal, the outputs the transducer means providing a first plurality of electrical signals, each of the transducer means being located in its respective pipeline a known equal distance from the center of the interconnection of the plurality of pipelines, the distance being measured along the center of said pipelines;
- means for comparing each of the first plurality of electrical signals with each other of the first plurality of electrical signals to produce a second plurality of electrical signals, each of which is responsive to one of the first plurality of electrical signals and is comprised of those portions of the one of the first plurality of electrical signals to which it is responsive that are not common to all of the first plurality of electrical signals;
- means for comparing the second plurality of electrical signals to detect which one of the signals was first produced; and
- means for actuating indicating means responsive to the one of the second plurality of electrical signals first produced indicating both the existence of the break or other occurrence generating a compressional wave and the particular pipeline in which the break or other occurrence exists.

* * * * *